United States Patent [19]

Boggs et al.

[11] Patent Number: 5,687,338
[45] Date of Patent: Nov. 11, 1997

[54] METHOD AND APPARATUS FOR MAINTAINING A MACRO INSTRUCTION FOR REFETCHING IN A PIPELINED PROCESSOR

[75] Inventors: Darrell D. Boggs, Aloha; Robert P. Colwell, Portland; Michael A. Fetterman; Andrew F. Glew, both of Hillsboro; Ashwani K. Gupta, Beaverton; Glenn J. Hinton, Portland; David B. Papworth, Beaverton, all of Oreg.

[73] Assignee: Intel Corporation, Santa Clara, Calif.

[21] Appl. No.: 511,296

[22] Filed: Aug. 4, 1995

Related U.S. Application Data

[63] Continuation of Ser. No. 204,467, Mar. 1, 1994, abandoned.
[51] Int. Cl.⁶ ................................................. G06F 9/38
[52] U.S. Cl. .................... 395/381; 395/183.11; 395/464; 364/DIG. 1
[58] Field of Search ..................... 395/375, 700, 395/650, 452, 464, 446, 417, 182.13, 183.15, 185.02, 183.11

[56] References Cited

U.S. PATENT DOCUMENTS

| | | | |
|---|---|---|---|
| 4,087,857 | 5/1978 | Joyce et al. | 395/572 |
| 4,253,142 | 2/1981 | Banoux et al. | 395/581 |
| 4,373,180 | 2/1983 | Linde | 395/586 |
| 4,390,946 | 6/1983 | Lane | 395/586 |
| 4,920,538 | 4/1990 | Chan et al. | 395/183.4 |
| 5,117,487 | 5/1992 | Nagata | 395/387 |
| 5,117,687 | 5/1992 | Nagata | 395/387 |
| 5,136,697 | 8/1992 | Johnson | 395/386 |
| 5,163,140 | 11/1992 | Stiles | 395/467 |
| 5,214,766 | 5/1993 | Lin | 395/451 |
| 5,261,066 | 11/1993 | Jouppi et al. | 395/449 |
| 5,261,071 | 11/1993 | Lyon | 395/467 |
| 5,283,873 | 2/1994 | Steely, Jr. et al. | 395/382 |
| 5,313,634 | 5/1994 | Eikemeyer | 395/587 |
| 5,361,389 | 11/1994 | Fitch | 395/527 |
| 5,377,336 | 12/1994 | Eikemeyer | 395/383 |
| 5,423,048 | 6/1995 | Jager | 395/585 |
| 5,450,586 | 9/1995 | Kazava et al. | 395/704 |

OTHER PUBLICATIONS

M. Johnson, "Superscalar Microprocessor Design", Prentice–Hall, Inc. 1991, pp. 71–77.

V. Popescu, et al., "The Metaflow Architecture," IEEE Micro, pp. 10–13 and 63–73, Jun. 1991.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A method and apparatus for instruction refetch in a processor is provided. To ensure that a macro instruction is available for refetching after the processor has handled an event or determined a correct restart address after a branch misprediction, an instruction memory includes an instruction cache for caching macro instructions to be fetched, and a victim cache for caching victims from the instruction cache. To ensure the availability of a macro instruction for refetching, the instruction memory (the instruction cache and victim cache together) always stores a macro instruction that may need to be refetched until the macro instruction is committed to architectural state. A marker micro instruction is inserted into the processor pipeline when an instruction cache line is victimized. The marker specifies an entry in the victim cache occupied by the victimized cache line. When the marker instruction is committed to architectural state, the victim cache entry specified by the marker is deallocated in the victim cache to permit storage of other instruction cache victims.

6 Claims, 9 Drawing Sheets

FIG_1

| ENTRY# | Mu | UOPCODE | LSRC1 | PSRC1 | SRC1 DATA | SRC1 VALID | LSRC2 | PSRC2 | SRC2 DATA | SRC2 VALID | IMMEDIATE DATA | SRC1 IMM VALID | SRC2 IMM VALID | LDST | PDST |
|---|---|---|---|---|---|---|---|---|---|---|---|---|---|---|---|
| 2 | M | JUMP.Z. pred | | | ZF Contents | 0→1 | × | × | × | × | 220 | 0 | 1 | EIP | ROBf |
| 3 | u | JUMP.NE. pred | | | T Contents | 0→1 | × | × | × | × | 6 | 0 | 1 | uIP | ROBn+1 |
| 9 | M | JUMP.indir | | | × | × | reg | ROBk | Reg Contents | 0→1 | Predicted IP | 1 | 0 | EIP | ROBk+1 |
| 10 | | | | | | | | | | | | | | | |

FIG_3

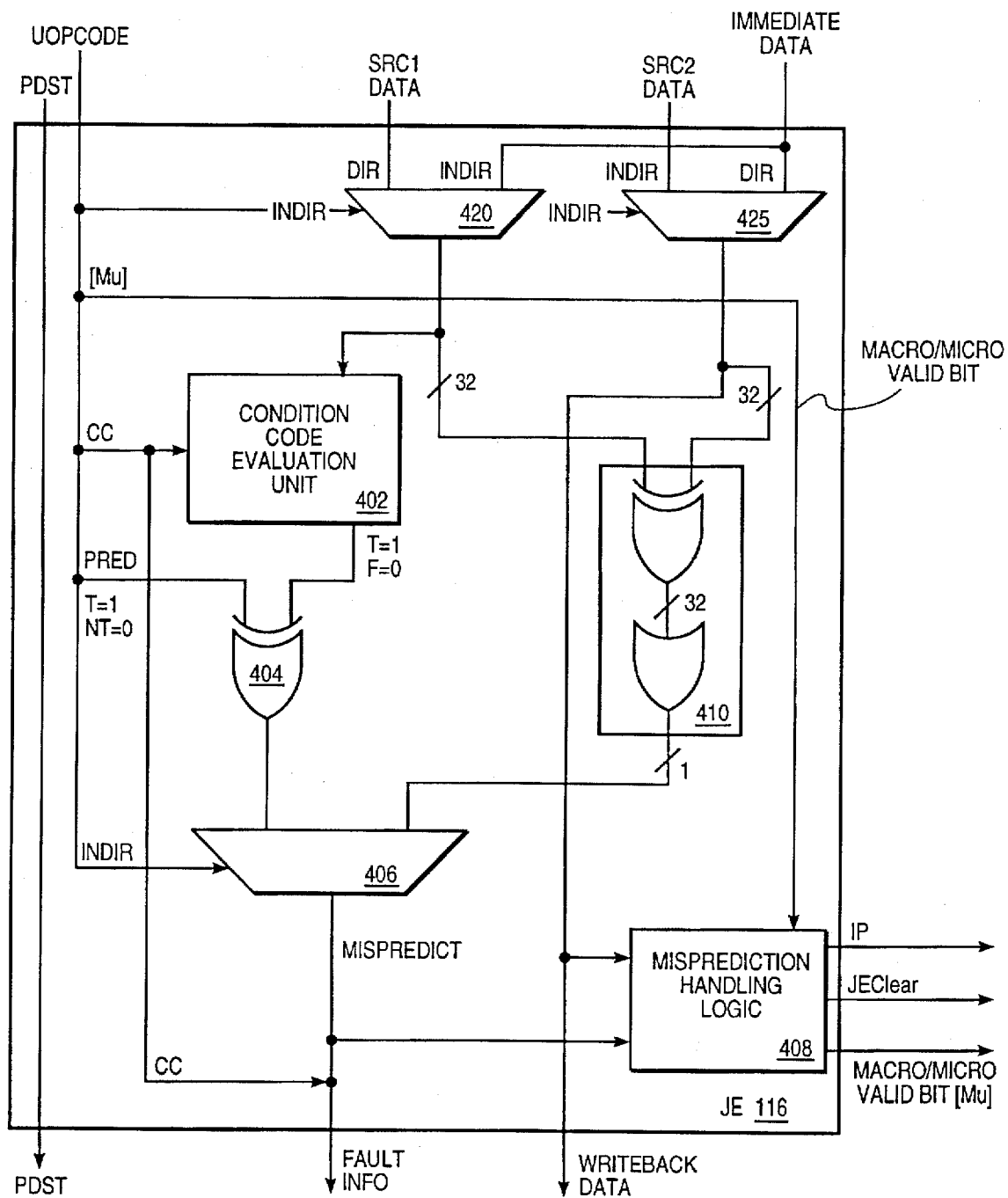
FIG_4

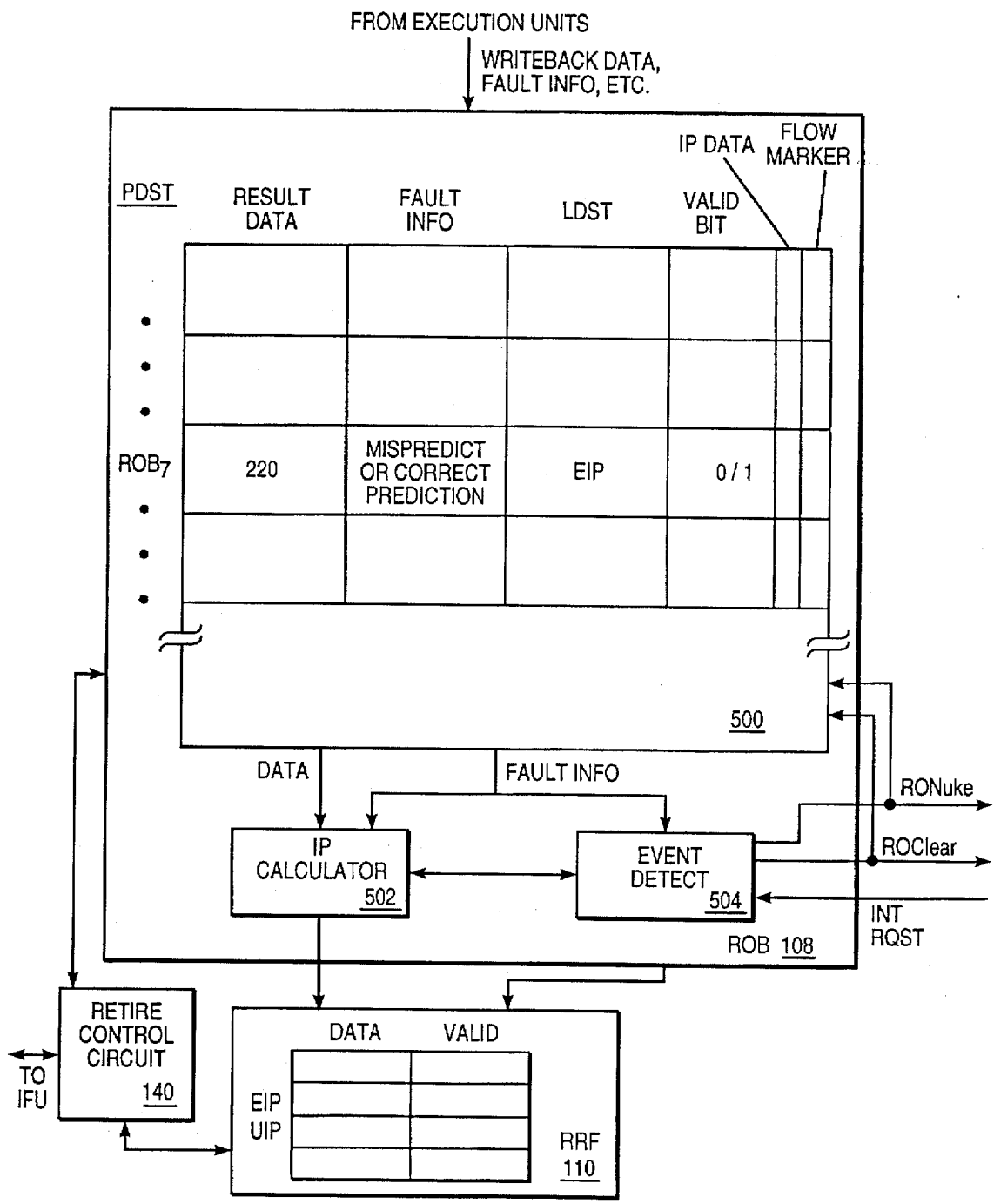
FIG_5

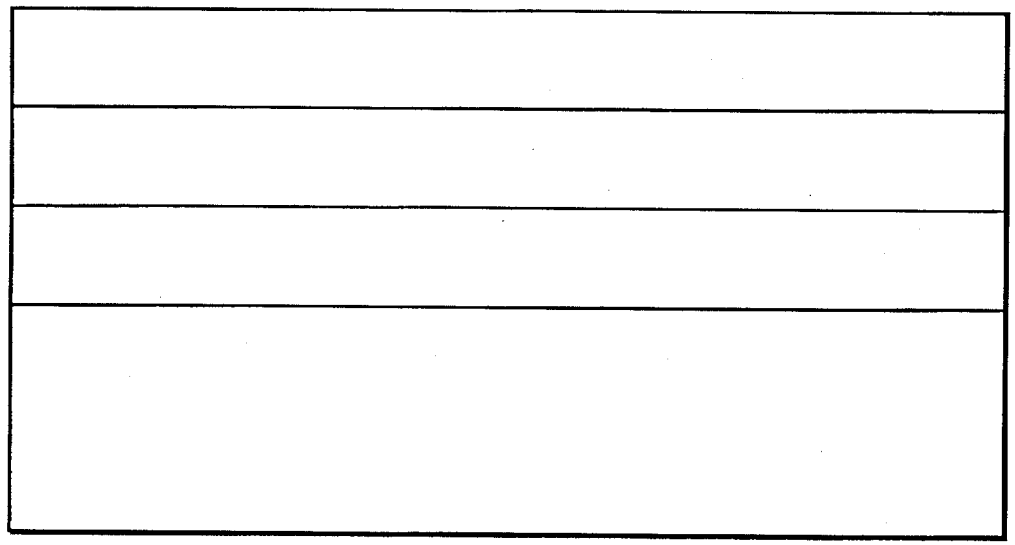
FIG_6

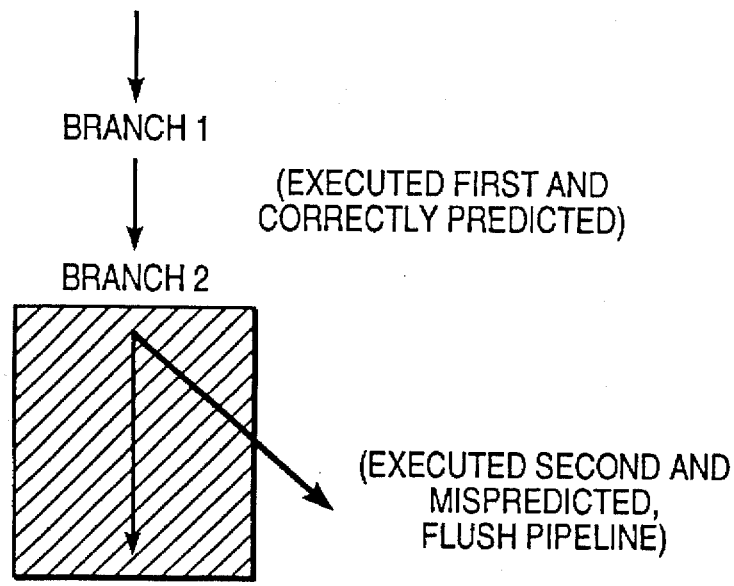
FIG_7A
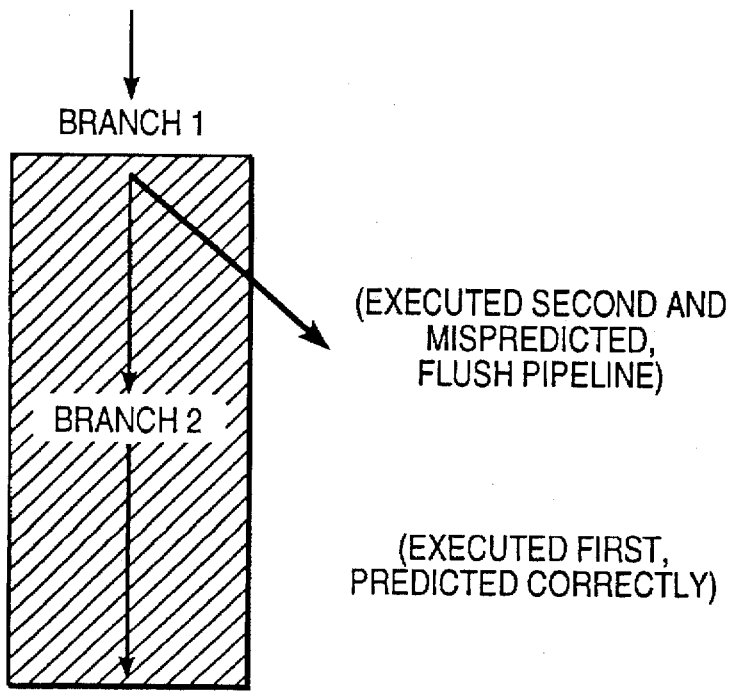
FIG_7B

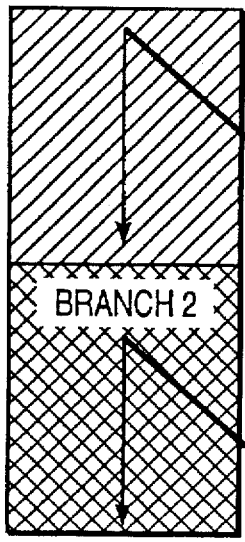
(EXECUTED SECOND AND MISPREDICTED, FLUSH PIPELINE)
(EXECUTED FIRST AND MISPREDICTED, FLUSH PIPELINE)
FIG_7C
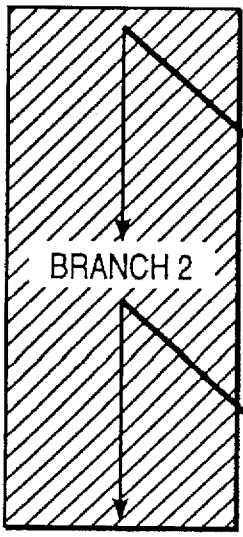
(EXECUTED FIRST AND MISPREDICTED, FLUSH PIPELINE)
(EXECUTED SECOND AND MISPREDICTED, DO NOT FLUSH PIPELINE)
FIG_7D

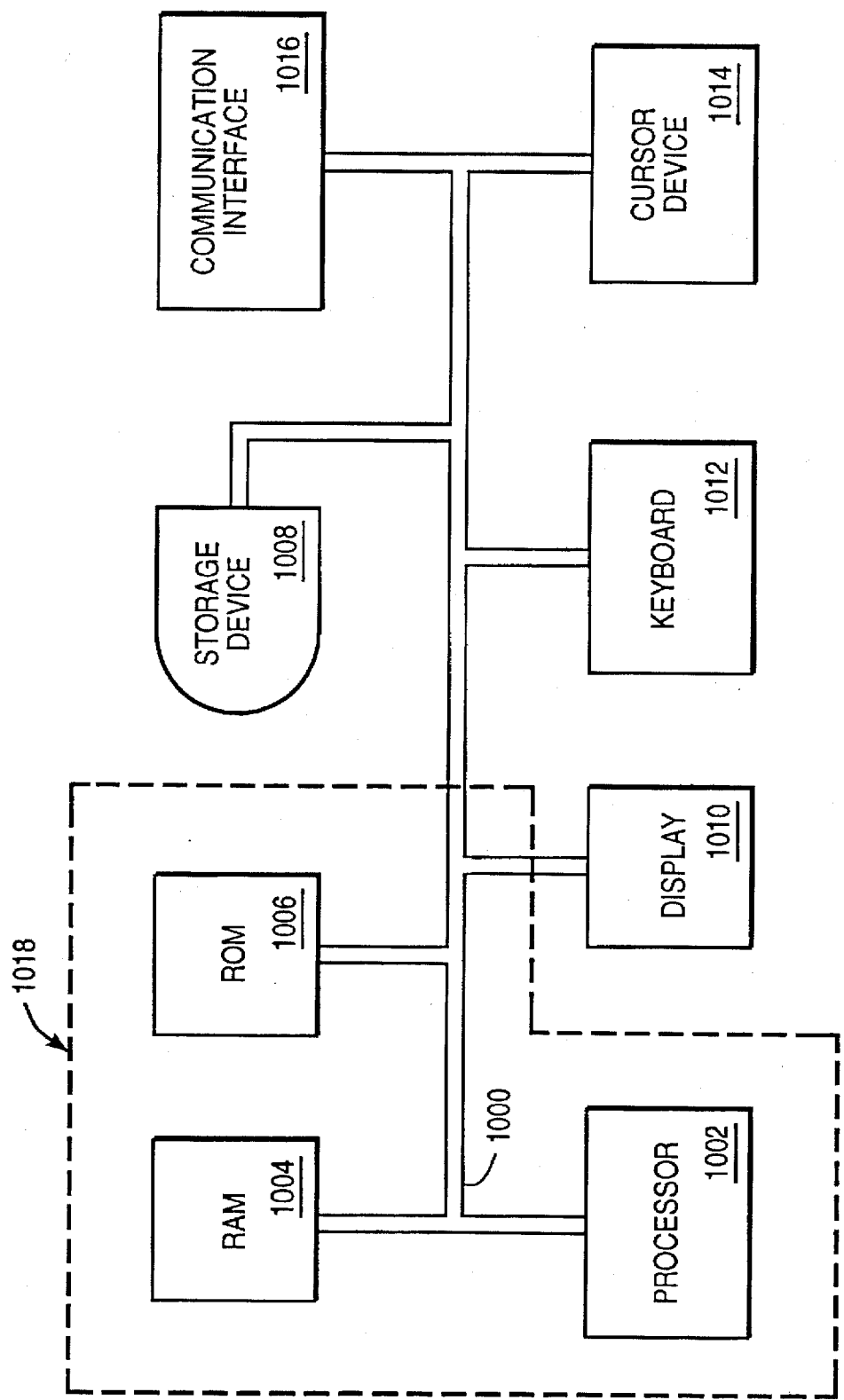
FIG_X

METHOD AND APPARATUS FOR MAINTAINING A MACRO INSTRUCTION FOR REFETCHING IN A PIPELINED PROCESSOR

This is a continuation of application Ser. No. 08/204,467, filed Mar. 1, 1994, now abandoned.

BACKGROUND OF THE INVENTION

1. Field of the Invention

The invention relates to pipelined processors, particularly those in which conditions leading to a change of flow of control are recognized at different stages in the pipeline. The invention is particularly pertinent to speculative out-of-order processors.

2. Art Background

Changes of Flow of Control in Pipeline Processors

Simple microprocessors generally process instructions one at a time. Each instruction can be considered to be processed in four sequential stages:

instruction fetch (IF);

operand fetch (OF);

execute (EX); and writeback (WB).

During instruction fetch, an instruction pointer from a program counter is sent to an instruction memory, such as an instruction cache, to retrieve an instruction. The instruction specifies an op code and source and destination register addresses. During operand fetch, a register file is addressed with the source register addresses to return the source operand values. During the execution stage, the instruction and the source operand values are sent to an execution unit for execution. During writeback, the result value of the execution is written to the register file at the destination register address obtained during the instruction fetch stage.

Within simple microprocessors, different dedicated logic blocks perform each processing stage. Each logic block waits until all the previous logic blocks complete operations before beginning its operation. The program counter is incremented so as to fetch instructions from instruction memory sequentially. The sequence of instruction pointer values issued by the program counter is called the flow of control. Most frequently, the flow of control simply steps sequentially from one instruction to another. Occasionally, non-sequential changes in the flow of control occur. Reasons for such changes in flow of control include:

(1) Branch instructions (2) Exceptions (3) Interrupts

Branch instructions are particular instructions which indicate the manner in which the flow of control should change. Branch instructions may be:

(1) unconditional direct (the branch is always taken, to an address specified in the instruction);

(2) conditional direct (a condition is evaluated and, if the condition is true, instruction pointers change to the address specified in the instruction; if not true, the instruction pointer continues to increment sequentially);

(3) indirect (the instruction pointer is changed to the address whose value is contained by a register specified by the branch instruction);

(4) conditional indirect branches (indirect branches for which the instruction pointer is changed to the value contained in the specified register only if the condition is true).

Exceptions are unexpected events associated with instructions, e.g., page fault on memory accesses, data break point traps, or divide-by-zero conditions. Exceptions cause the flow of control to be directed to an exception handler that investigates the cause of the exception and typically repairs it so that execution can continue, or otherwise performs exception handling.

Interrupts are events that occur from outside of the processor that may be initiated by the devices coupled to the same bus as the processor. As do exceptions, interrupts typically cause the flow of control to be directed to an interrupt handler within the processor.

Without pipelining, the processing of a simple sequence of instructions including a branch instruction may be depicted as follows:

TABLE 1

Pipeline Diagram for a Non-Pipelined Processor

| Instruction | | Time (Cycle #) | | | | | | | | | | | |
|---|---|---|---|---|---|---|---|---|---|---|---|---|---|
| # | Operation | 1 | 2 | 3 | 4 | 5 | 6 | 7 | 8 | 9 | 10 | 11 | 12 |
| 100 | Add ... | IF | OF | EX | WB | | | | | | | | |
| 101 | Jump 200 | | | | | IF | OF | EX | WB | | | | |
| 200 | Add ... | | | | | | | | | IF | OF | EX | WB |

To improve microprocessor efficiency, microprocessor designers overlap the pipeline stages so that the microprocessor operates on several instructions simultaneously. The instruction sequence of Table 1 may be pipelined as follows so that the execution of instruction 100 occurs at the same time as the fetching of the operands for instruction 101:

TABLE 2

Pipeline Diagram for a Pipelined Processor

| Instruction | | Time (Cycle #) | | | | |
|---|---|---|---|---|---|---|
| # | Operation | 1 | 2 | 3 | 4 | 5 |
| 100 | Add ... | IF | OF | EX | WB | |
| 101 | Jump 200 | | IF | OF | EX | WB |
| 200 | Add ... | | | IF | OF | EX | WB |

Pipelining improves instruction throughput by overlapping the instruction cycle pipe stages. However, in the case of branch instructions it may be necessary to fetch the next instruction before it is determined whether the branch instruction is a taken branch (for a conditional branch instruction) or before it is determined whether an exception occurs during execution of the branch instruction. For example, in Table 2, the result of the jump instruction at address 101 may not be known until the execution stage of the instruction. Given this, the processor may continue fetching instructions sequentially after 101, as depicted below.

TABLE 3

Pipeline Diagram for a Pipelined Processor

| Instruction | | Time (Cycle #) | | | | | | | |
|---|---|---|---|---|---|---|---|---|---|
| # | Operation | 1 | 2 | 3 | 4 | 5 | | | |
| 100 | Add ... | IF | OF | EX | WB | | | | |
| 101 | Jump 200 | | IF | OF | EX | WB | | | |
| 102 | ... | | | IF | OF | | | | |
| 103 | ... | | | | IF | | | | |
| 200 | Add ... | | | | | | IF | OF | EX | WB |

If an exception occurs during the execution stage of instruction 101, then the two subsequent instructions were erroneously fetched. There are a number of mechanisms for handling such erroneous fetching, such as flushing or canceling the erroneously fetched instructions, as indicated above.

In even the simplest pipelines, situations arise where changes in the flow of control must be prioritized. For example, in the system described above an exception relating to instruction fetch (such as a page fault) may be recognized during the IF pipestage, but the change of flow of control for a jump is effected at the WB pipestage. In that case the instruction fetch exception for instruction 102 is recognized in clock cycle 3, two cycles before the change of flow of control resulting from the branch instruction 101, which is recognized in cycle 5. However, because instruction 101 is an unconditional jump instruction, then the branch must be taken, meaning that any exceptions that occur during instruction 102 are not important because instruction 102 was erroneously fetched. Thus, the handling of the instruction fetch exception for instruction 102 must be prevented from occurring (or, if already started, must be canceled) because the change of flow of control resulting from jump instruction 101 takes priority over the instruction fetch exception of instruction 102 even though the change of flow caused by instruction 101 is recognized later in time.

The bookkeeping and control logic necessary to handle such prioritization quickly becomes onerous, and has proven to be the source of bugs in many processors.

To complicate matters further, many processors go further than simple pipelining and include super pipelining and/or superscalar operations. Superpipelining increases the granularity of the instruction pipeline, e.g., instead of allocating one clock cycle for an instruction fetch, two may be employed. A superscalar processor is capable of having more than one instruction in the same pipestage at the same time. The addition of these features exacerbates the problem caused by changes in control flow being recognized at different times for different instructions within the pipelines.

Speculative Out-of-order Processors

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instructions until the condition is resolved. Since the condition will not be resolved until further down the pipeline, the instruction fetch unit cannot necessarily fetch the proper instructions.

To alleviate this problem, some newer pipelined microprocessors use branch prediction mechanisms that predict the outcome of branches, and then fetch subsequent instructions according to the branch prediction. In one mode, branch prediction may be achieved using a branch target buffer (BTB) to store the history of a branch instruction based only upon the instruction pointer or address of that instruction. Every time a branch instruction is fetched, the BTB predicts the target address of the branch using the branch history. For a more detailed discussion of branch prediction, please refer to Tse Yu Yeh and Yale N. Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992.

In combination with speculative execution, out-of-order dispatch of instructions to the execution units results in a substantial increase in instruction throughput. With out-of-order dispatch, any number of instructions are allowed to be in execution in the execution units, subject to the limitations imposed by various hardware buffers. Instructions may complete out of order because instruction dispatch is not stalled when a functional unit takes more than one cycle to compute a result. Consequently, a functional unit may complete an instruction after subsequently dispatched instructions have already completed. For a detailed explanation of speculative out-of-order execution, please refer to M. Johnson, *Superscalar Microprocessor Design*, Prentice Hall, 1991, Chapters 2,3,4, and 7.

In a processor using out-of-order dispatch, instruction dispatch is stalled when there is a conflict for a functional unit or when an issued instruction depends on a result that is not yet computed. To prevent or mitigate stalls in decoding, the prior art provides for a buffer (known as a reservation station (RS)) between the decode and execute stages. The processor decodes instructions and places them into the reservation station as long as there is room in the buffer, and at the same time, examines instructions in the reservation station to find those that can be dispatched to the execution units (that is, instructions for which all source operands and the appropriate execution units are available).

Instructions are dispatched from the reservation station with little regard for their original program order. However, the capability to issue instructions out-of-order introduces a constraint on register usage. To understand this problem, consider the following pseudo-microcode sequence:

1. t←load (memory)
2. eax←add (eax, t)
3. ebx←add (ebx, eax)
4. eax←mov (2)
5. edx←add (eax, 3)

The micro-instructions and registers shown above are generic and will be recognized by those familiar with the art as those of the well known Intel microprocessor architecture.

In an out-of-order machine executing these instructions, it is likely that the machine would complete execution of the fourth instruction before the second instruction, because the third ADD instruction may require only one clock cycle, while the load instruction and the immediately following ADD instruction may require a total of four clock cycles, for example. However, if the fourth instruction is executed before the second instruction, then the fourth instruction would probably incorrectly overwrite the first operand of the second instruction, leading to an incorrect result. Instead of the second instruction producing a value that the third instruction would use, the third instruction produces a value that would destroy a value that the second one uses.

This type of dependency is called a storage conflict, because the reuse of storage locations (including registers) causes instructions to interfere with one another, even though the conflicting instructions are otherwise independent. Such storage conflicts constrain instruction dispatch and reduce performance.

It is known in the art that storage conflicts can be avoided by providing additional registers that are used to reestablish the correspondence between registers and values. Using register renaming, these additional "physical" registers are associated with the original "logical" registers and values needed by the program. To implement register renaming, the processor typically allocates a new register for every new value produced, i.e., for every instruction that writes a register. An instruction identifying the original logical register for the purpose of reading its value obtains instead the value in the newly allocated register. Thus, the hardware renames the original register identifier in the instruction to identify the new register and the correct value. The same register identifier in several different instructions may access different hardware registers depending on the locations of register references with respect to the register assignments.

With renaming, the example instruction sequence depicted above becomes:

1. $t_a \leftarrow$ load (mem)
2. $eax_b \leftarrow$ add ($eax_a, t_a$)
3. $ebx_b \leftarrow$ add ($ebx_a, eax_b$)
4. $eax_c \leftarrow$ mov (2)
5. $edx_a \leftarrow$ add ($eax_c, 3$)

In this sequence, each assignment to a register creates a new instance of the register, denoted by an alphabetic subscript. The creation of a renamed register for eax in the fourth instruction avoids the resource dependency on the second and third instructions, and does not interfere with correctly supplying an operand to the fifth instruction. Renaming allows the fourth instruction to be dispatched immediately, whereas, without renaming, the instruction must be delayed until execution of the second and third instructions. When an instruction is decoded, its result value is assigned a location in a functional unit called a reorder buffer (ROB), and its destination register number is associated with this location. This renames the destination register to the reorder buffer location. When a subsequent instruction refers to the renamed destination register, in order to obtain the value considered to be stored in the register the instruction may instead obtain the value stored in the reorder buffer if that value has already been computed.

The use of register renaming not only avoids register resource dependencies which are not true data dependencies to permit out-of-order execution, but also plays a key role in speculative execution. If the instruction sequence given above is considered to be part of a predicted branch, then one can see that execution of those instructions using the renamed registers in the ROB has no effect on the actual registers denoted by instruction. Thus, if it is determined that the branch was mispredicted, the results calculated and stored in the ROB may be erased or ignored and the pipeline may be flushed without affecting the actual registers found in the processor's register file (RF). If the predicted branch affected the values in the RF, then it would be difficult to recover from branch misprediction because it would be difficult to determine the values stored in the registers before the predicted branch was taken without the use of redundant registers in the ROB.

When a result is produced, it is written to the ROB. The result may provide an input operand to one or more waiting instructions buffered in the reservation station, indicating that the source operand is ready for dispatch to one or more execution units along with the instructions using the operand.

After the value is written into the ROB, subsequent instructions continue to fetch the value from the ROB, unless the entry is superseded by a new register assignment, until the value is retired by writing to the register file.

Retirement occurs in order of the original instruction sequence after execution of the instructions. After the processor determines that the predicted instruction flow is correct, the processor commits the speculative results of those instructions that were stored in the ROB to an architectural state by writing those results to the register file.

Macro and Micro Branch Instructions

Further complicating the control of instruction flow is the fact that complex instruction set computers (CISC) utilize complex instructions, wherein each instruction performs more than one arithmetic and/or logic function. One popular CISC architecture is that developed by Intel Corporation, the assignee of the present invention. CISC or "macro" instructions are broken down during decoding into a number of simpler instructions known as micro instructions or micro operations (uops). For example, in one particular implementation, the macro instruction ADD (eax, mem) adds the value stored in register eax to the value stored at memory location mem and places the result in register eax. This macro instruction may be decoded into the uop sequence:

t←load (mem)

eax←add (eax,t), where t denotes a temporary register.

A number of instructions have both macro and micro code equivalents. One set of such instructions are branch instructions, which redirect program control to another location in the program code. The location of an instruction is specified by its instruction pointer or IP. The instruction set of the Intel microprocessor architecture is indexed with both macro and micro IP's, and includes corresponding macro and micro branch instructions. Macro branch instructions redirect program control to a new macro instruction by changing the macro IP, while micro branch instructions redirect program code within a micro code sequence by modifying the micro IP.

The FAR_CALL instruction is an example of a branch instruction that implements both micro branch and macro branch jump instructions. The FAR_CALL instruction has different functions depending upon whether it is operating in an i8086™ processor ("real" mode) or in an i386™ processor ("protected" mode). Both processors are manufactured by Intel Corporation. In a simplified example, the macro instruction FAR_CALL (cs:offset) is decoded into the following pseudo micro code sequence of the Intel microprocessor architecture:

| UIP | UOP |
| --- | --- |
| 1 | t ← read_creg (CR0) |
| 2 | t ← and (t,P_bit) |
| 3 | ujne(t,6) |
|  | /*Real Mode 8086*/ |

-continued

| UIP | UOP |
|---|---|
| 4 | move_to_sreg (cs, inst_bytes_cs) |
| 5 | eip ← Mjump (offset) /*ProtMode 386*/ |
| 6 | write CS selector |
| 7 | write CS base |
| 8 | write CS limit |
| 9 | write CS permissions |
| 10 | eip ← Mjump (offset) |

The above pseudo micro code depicts the most important operations, omitting some details.

A detailed explanation of the micro code may be found in the *i486™ Microprocessor Programmers Reference Manual*, published by Osborne-McGraw Hill, 1990, which is also available directly from Intel Corporation of Santa Clara, Calif. For purposes of explanation, however, these details are unimportant here.

The salient feature of the FAR_CALL macro instruction is that if the P_bit is set, then micro code program control is directed to the sequence of micro instructions in the protected mode (PROT MODE) segment of the sequence. Otherwise, micro program control continues on into the real mode segment. Branching within the micro code sequence is controlled by the micro instruction ujne, which performs branching to the protected mode segment if the temporary register t holds a non-zero value. Conversely, program flow falls through to the real mode segment if the value in register t is zero. The micro jump instruction redirects micro program control by setting the value of the micro IP (uip) to either the IP of the real mode segment or the protected mode segment.

The FAR_CALL instruction also provides an example of a uop performing a macro branch. The uop eip←M jump (offset) is the equivalent of the macro instruction JUMP (offset). The distinction between a micro branch and macro branch instruction is that a micro branch instruction changes the micro IP while a macro branch instruction modifies the macro IP. The macro IP is stored in the register eip in the Intel microprocessor architecture.

The dichotomy between macro and micro instruction branches introduces further complexity into the mechanism by which instruction flow is controlled. Based on the example above, it can be seen that the microcode flow of control can change, but must not affect the macro instruction control flow. This distinction drastically increases design complexity, and is another potential source of bugs.

Note that branching in the Intel architecture microprocessor and other processors may be performed using a relative address or an absolute address. Using absolute addressing, the branch instruction directly specifies the address of the next instruction to be executed. Using relative addressing, the programmer directs program control to the destination instruction pointer by specifying in the instruction the displacement necessary to reach the target instruction pointer. In other words, the destination address is formed by adding the displacement to the current instruction pointer. This sum, which is stored in the instruction pointer register, designates the absolute address of the next instruction to be executed.

One problem that must be addressed when using relative addressing in an out-of-order processor is the difficulty of computing the absolute target address before branching to that address. The current instruction pointer maintained by the processor typically changes in an out-of-order fashion before it can be added to the displacement during the execution of the branch instruction. One way of overcoming this problem is to attach the current instruction pointer as a field of the branch instruction as it flows through the processor. However, this technique requires extra storage space on the processor chip. Thus, it is desired to find a simpler, less space-intensive method of ensuring branching to the correct target instruction pointer.

Another problem encountered in a pipelined processor is based on the fact that, during the time it takes for a processor to fetch an instruction and detect and handle an event or determine the correct restart after a branch misprediction, the instruction may no longer be stored in an instruction cache from which the instruction was originally fetched. For example, a second processor coupled to the cache may cause the cache line that previously contained a faulting instruction to be overwritten, thereby causing cache incoherency. Accordingly, it is desirable to find a way to ensure that instructions that may need to be refetched are available when necessary.

Further, because a macro instruction may be decoded into a representative sequence of micro instructions, after, for example, handling an event that interrupts the retirement of the macro instruction, the micro instruction sequence may need to be restarted at the correct micro instruction pointer so that the processor can complete the macro instruction that was interrupted by the event. Thus, it is desired to provide a simple mechanism for maintaining the micro instruction pointer.

SUMMARY OF THE INVENTION

The present invention provides a method and apparatus for instruction refetch in a processor. To ensure that a macro instruction is available for refetching after the processor has handled an event or determined a correct restart address after a branch misprediction, the present invention provides an instruction memory for storing macro instructions to be fetched by the processor. The instruction memory includes an instruction cache for caching the macro instructions into cache lines of the instruction cache, and a victim cache for caching victim cache lines from the instruction cache. To ensure the availability of a macro instruction for refetching, the instruction memory (the instruction cache and victim cache together) always stores a macro instruction that may need to be fetched until the macro instruction is committed to architectural state.

To control access to the victim cache, a marker micro instruction is provided. The marker micro instruction is inserted into the processor pipeline when an instruction cache line is victimized. The marker specifies an entry in the victim cache occupied by the victimized cache line. When the marker instruction is committed to architectural state, the victim cache entry specified by the marker is deallocated in the victim cache to permit storage of other instruction cache victims. If the victim cache becomes full, instruction fetching is stalled until deallocation to avoid attempts to stored more instructions in the instruction cache and the victim cache. When the victim cache is full and an event or branch misprediction occurs that may prevent commitment of the marker micro instruction to architectural state, then the marker micro instruction is reinserted into the pipeline. This ensures that at some point the maker micro instruction will be committed to architectural state so that the corresponding victim cache entry (and all older victim cache entries) can be deallocated so that instruction fetching may recommence, and instructions can again be cached in the instruction cache and the victim cache.

BRIEF DESCRIPTION OF THE DRAWINGS

FIG. 3 illustrates a reservation station of the present invention.

FIG. 4 illustrates a jump execution unit of the present invention.

FIG. 5 illustrates a reorder buffer and real register file of the present invention.

FIG. 6 illustrates a branch instruction table of the present invention.

FIGS. 7a–7d illustrate the handling of multiple branch mispredictions according to the present invention.

FIG. 8 illustrates a computer system of the present invention.

DETAILED DESCRIPTION OF THE INVENTION

The present invention provides a method and apparatus for handling the change of the flow control in a pipelined microprocessor. For purposes of explanation, specific details are set forth to provide a thorough understanding of the present invention. However, it will be understood by one skilled in the art, from reading this disclosure, that the invention may be practiced without these details. In particular, this invention was motivated by the complexities of changing the flow of control in a speculative, out-of-order processor, but most, if not all, aspects of the invention apply to pipelined processors where a change of control flow can be detected at different pipestages, regardless of whether the processor implements speculative and/or out-of-order operations. Moreover, well-known elements, devices, process steps and the like are not set forth in detail in order to avoid obscuring the present invention.

I. SYSTEM BLOCK DIAGRAM

Figure 1:
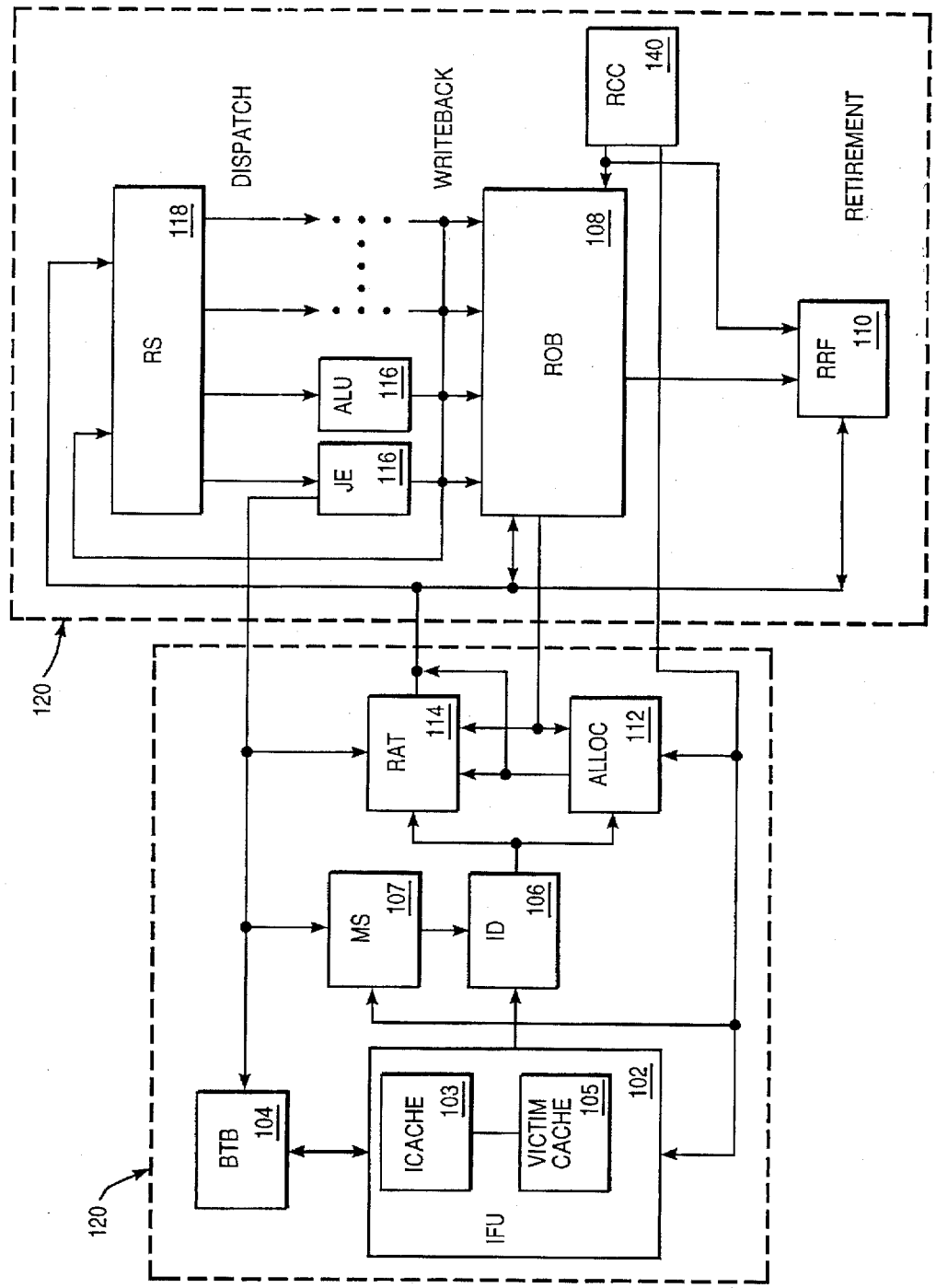
FIG. 1 is a block diagram of a processor of the present invention.

FIG. 1 is a block diagram of an embodiment of a speculative out-of-order processor of the present invention. The processor comprises an in-order section 120 and an out-of-order section 130. The in-order section (front end) 120 includes an instruction fetch unit (IFU) 102, a branch target buffer (BTB) 104, an instruction decoder (ID) 106, a micro instruction sequencer (MS) 107, an allocator (ALLOC) 112 and a register alias table (RAT) 114. The out-of-order section (back end) 130 includes a reservation station (RS) 118, a number of execution units (EUs) 116 including a jump execution unit (JE), a retire control circuit (RCC) 140, a reorder buffer (ROB) 108 and a real register file (RRF) 110.

In the front end 120, the IFU 102 is coupled to the branch target buffer 104 and the instruction decoder 106. The BTB 104 provides a predicted instruction pointer (IP) to the IFU 102. The IFU 102 includes an instruction cache 103. The instruction cache 103 caches instructions from memory to provide high speed access to the instructions. The IFU 102 fetches the macro instruction found at the address in memory specified by the IP from either the cache 103 (if instruction cached) or memory (not shown).

Each instruction is decoded into one or more micro-operations (uops) by the instruction decoder 106 with the help of a micro instruction sequencer (MS) 107. The MS 107 provides at least one microcode sequence in response to a corresponding micro instruction pointer (uip) that points to the first instruction in the sequence. Typically, the MS 107 also implements microcode for handling exceptions and interrupts. For one embodiment, the MS implements the handling routines used by the Intel microprocessor architecture.

During decoding, flow markers (not shown) are attached to each micro instruction. The flow marker indicates whether the micro instruction is the first or last micro instruction in a microcode sequence representing a macro instruction. The flow markers include a "beginning of macro instruction" (BOM) and "end of macro instruction" (EOM) flow marker. If a macro instruction maps to only one micro instruction, then that micro instruction carries both the BOM and EOM flow markers.

The instruction decoder 106 transfers the stream of uops to the register alias table (RAT) 114 and the allocator (ALLOC) 112. In one embodiment, the instruction decoder 106 issues up to three in-order uops during each cycle of the processor.

The allocator 112 assigns each incoming uop to a location in the reorder buffer (ROB) 108 in the same order as received from the ID 106, thereby mapping the logical destination address (LDST) of each uop to a corresponding physical destination address (PDST) in the ROB. The allocator 112 maintains an allocation pointer pointing to the next ROB entry to be allocated. The allocator also receives a retirement pointer from the RCC 140, indicating which uops stored in the ROB are to be committed to architectural state in the real register file 110. Based upon the received retirement pointer, the allocator 112 deallocates retired ROB entries to make them available for reallocation.

The register alias table (RAT) 114 maintains the mapping between logical and physical register addresses. To account for retirement, the RAT 114 stores a real register file valid bit (RRFV) that indicates whether the value indicated by the logical address is to be found at the physical address in the ROB or in the RRF after retirement. Based upon this mapping, the RAT 114 thus also associates every logical source address to a corresponding location in the ROB or the RRF (the source operand of one instruction generally will have been the destination of a previous instruction).

Each incoming uop is also assigned and written into an entry in the reservation station 118 by the allocator 112. The reservation station (RS) 118 assembles the micro-operations awaiting execution by an appropriate execution unit, such as a Jump (or branch) execution unit or a memory execution unit (MEM EU) (not shown).

When all the source operands of a micro instruction are available and the appropriate execution unit (specified by a uopcode) is ready, the micro instruction is dispatched from the RS 118 to the execution unit for execution. The execution unit writes back the result into the ROB 108 at the location pointed to by the PDST of the dispatched micro instruction. According to the present invention, the execution unit also writes back fault information (fault info) indicating status information such as exception conditions and branch misprediction. As described below, the present invention uses the fault information to correct branch mispredictions and ensure proper handling of exceptions.

The ROB 108 is implemented as a circular buffer that stores the speculatively executed results of micro instructions written back from the execution units. In one mode, micro instruction entries in the ROB are retired in original program order into a real register file (RRF) 110 according to a retirement pointer. The retirement pointer is maintained in the RCC 140 and points to all uops for which the processor has determined that the predicted instruction flow is correct. The retirement pointer may be implemented as a simple counter that accounts for the wraparound property of the circular ROB buffer.

II. OPERATION OF THE INVENTION

The general operation of the present invention will now be described, followed by a more detailed description of particular functional units.

A. FLOW CONTROL INSTRUCTION FORMATS

As mentioned above, a number of operations cause a change in instruction flow: branches, exceptions and interrupts. The present invention deals with these operations in a unique manner by recognizing their existence early in the pipeline, but handling them later on. To do so, the information that a change in instruction flow is to take place must be carried down the pipeline from the unit that detects the information to the unit that will act upon it. Thus, this information must be formatted within the instructions traveling in the processor pipe.

For branch instructions, two basic micro instruction formats are used: one for conditional uops and one for indirect uops. The conditional uop format can be described as follows:

[Mu].JUMP.cc.pred(flags,target)

where the field "[Mu]" indicates whether the uop is a macrobranch [M] or a microbranch [u], "JUMP" indicates that the instruction is a branch instruction, "cc" indicates the nature of the condition, "pred" is a prediction bit indicating whether the branch is predicted to be taken or not taken, "flags" specify flag registers, and "target" is the target address of the branch. A sample set of conditions may be found in the i486™ Programmers Reference Manual, although the present invention is not limited to those conditions.

The target address space for a microbranch instruction is typically much smaller than that for a macrobranch instruction. Accordingly, in one embodiment the instruction field used to maintain the target address may also hold the fall through address of the branch instruction.

Note that an unconditional branch may be obtained by specifying a constant register that always contains a value of zero as the first operand, with a condition that returns true for a zero operand.

The uop format for indirect branches can be described as follows:

[Mu].JUMP_INDIR(predicted_IP,reg)

The uopcode "JUMP_INDIR" indicates an indirect branch, and the field "[Mu]" indicates whether a macro or micro branch is to be taken. The first source operand is the predicted target, which is supplied by the BTB branch prediction for a macro instruction or from a static prediction for a micro instruction. The second source operand is the actual target, which is obtained from a register (ROB or RRF entry or directly from the result of a preceding instruction).

A conditional indirect branch can be obtained by specifying a register as the second operand of the conditional branch format. Such an instruction would have the format:

[Mu].JUMP_INDIR.cc.pred(flags,reg).

With respect to the fields of the instructions, for macro branch instructions the prediction bit may be set by the branch prediction mechanism of the BTB 104. Based upon the branch history maintained by the BTB, the BTB provides an output of the form IP.predV.pred, where IP is the instruction pointer sent by the BTB 104 to the IFU 102 for fetching of the next instruction. The prediction valid bit (predV) indicates whether a prediction has been made. The prediction taken bit (pred) indicates whether the BTB predicted that the branch would be taken (T) or not taken (NT). The prediction taken bit is inserted into the instruction during decoding of the branch instruction.

For micro branch instructions, the prediction bit may be set by a (human) microcode programmer based upon the programmer's expectation of whether the branch will be taken or not. A 1 bit may represent a taken branch while a 0 bit a non-taken branch.

The flags of the flags registers specify the results of previous instructions to be used in evaluating the conditions denoted by the condition (cc) fields. The flags of the flags registers are set during instruction execution, and typically include a carry flag (CF), a parity flag (PF), a zero flag (ZF), a sign flag (SF), and an overflow flag (OF). The flags registers are mapped to physical register addresses in the ROB in much the same way as other registers. A detailed description of the flags used in the Intel microprocessor architecture may be found in the i486™ Programmers Reference Manual. The present invention is not limited to that set of flags.

The instruction set of the present invention also includes a unique micro instruction that communicates event information from "early" units in the pipeline (e.g., IFU 102 and ID 106) to the fault info field of the ROB 108. That micro instruction has the format:

sig_event(fault info)

Units in the in-order part of the processor report events by signaling the ID 106 to insert the sig_event uop into the micro instruction stream. For example, upon detection of a page fault the IFU 102 causes the ID 106 to insert the sig_event uop into the instruction stream including fault info indicating the nature of the fault. Similarly, if the ID 106 receives an illegal instruction, it inserts into the instruction stream a sig_event uop specifying the nature of the fault. One skilled in the art would recognize that a wide variety of other conditions can lead to the generation of the sig_event uop and be specified therein.

As for interrupts, the present invention does not require any special format for interrupt vectors. Even so, as will be shown below, the present invention handles interrupts in a novel and unique manner.

B. MACRO TO MICRO INSTRUCTION DECODING

Based upon the IP sent by the BTB 104 to the IFU 102, the IFU 102 fetches the macro instruction found at the address indicated by the IP. The instruction is decoded into one or more micro operations (uops) by instruction decoder 106.

Examples of the macro to micro instruction decoding using the above described uop formats include:

JMP100—unconditional jump
    MJUMP.z.pred(constant_0_register, 100)
JNE200—conditional jump
    MJUMP.ne.pred(flags, 200)
JMP eax—indirect jump through eax
    [M]JUMP_INDIR(predicted_ip, eax)

Note that sig_event is not decoded because it is a micro instruction and not a macro instruction.

The ID 106 transfers the decoded uops to the RAT and allocator to effect renaming of the logical registers specified by the uops to physical locations in the ROB 108 and RRF 110. In one embodiment, the instruction decoder issues up to three in-order uops during each cycle of the processor. A renamed uop is buffered in the reservation station 118 until all source operands and the appropriate execution unit are available for executing the uop. At that time, the buffered uop is dispatched from its entry in the reservation station to the execution unit.

In one embodiment, the jump execution unit 116 is the first unit in the processor pipeline to handle changes of control flow in conjunction with the reorder buffer 108. For the most part, the change of control flow, the correction of branch mispredictions and the handling of exceptions and interrupts are implemented by the JE 116 and the ROB 108.

B. BRANCHES

The present invention directs the flow of instructions through both direct and indirect branches, which may be conditional or unconditional.

1. DIRECT BRANCHING

The handling of a conditional jump direct instruction by the JE 116 and the ROB 108 may be described according to the following pseudocode representation, which is discussed in further detail below:

```
IF cc (flags) is true THEN
    IF pred was taken THEN
        write "correctly predicted + taken" into ROB
        write target IP into ROB
        retire target IP to RRF
    ELSE
        write "mispredicted + taken" into ROB
        assert JEClear
        IP := target IP
        write correct IP into ROB
        stall instruction issue*
        after retirement of mispredicted branch, assert ROClear
        unstall instruction issue*
        retire correct IP
ELSE
    IF pred was taken THEN
        write "mispredicted + not taken" into ROB
        assert JEClear
        IP := next IP (for instruction restart)
        stall instruction issue*
        after retirement of mispredicted branch, assert ROClear
        unstall instruction issue*
        increment IP in ROB (for retirement)
        retire correct IP
    ELSE
        write "correctly predicted + not taken" into ROB
        increment IP in ROB
        retire IP
```

*Stalling instruction issue is optional. When implemented in an out-of-order processor, the present invention may stall the issue of micro instructions from the in-order section to the out-of-order section.

As discussed above, unconditional direct branches are merely handled as a simple special case of conditional direct branches.

(a) CORRECTLY PREDICTED DIRECT BRANCH CONTROL FLOW (i) Condition indicates taken, Branch predicted taken If a condition specified by the flags is true, this indicates that the branch should have been taken. According to the pseudocode, if the condition specified by the flags is true and the prediction bit indicated that the prediction should have been taken, then the prediction was correct, i.e., the predicted instruction flow is the same as the "correct" instruction flow indicated by the flow control indicator "correctly predicted+taken," which is written into the fault info field of the ROB 108 shown in FIG. 5. The JE also writes the target instruction pointer (EIP for macro branches and UIP for micro branches) into the reorder buffer. Using the target IP, the ROB 108 updates its copy of the IP, instead of causing the IP to be incremented to point to the branch fall through instruction. Upon retirement, this instruction pointer is written into the appropriate architectural instruction pointer register (EIP or UIP) in the RRF 110.

(ii) Condition indicates not taken, Branch predicted not taken

On the other hand, if the condition specified by the flags is false, then the branch should not have been taken. If the prediction was that the branch was not to be taken, then the prediction was correct, and the flow control indicator "correctly predicted+not taken" is written into the fault info field of the ROB according to the pseudocode. In that case, the instruction pointer (EIP or UIP) is simply incremented to point to the next instruction. Upon retirement, this instruction pointer information is written into the appropriate architectural instruction pointer register in the RRF 110.

INCORRECTLY PREDICTED BRANCH INSTRUCTION FLOW (i) Condition indicates taken, Branch predicted not taken Mispredicted branches are handled differently. If the condition flags indicate that the branch should have been taken, but the prediction was "not taken," then the JE 116 writes the flow control indicator "mispredicted+taken" into the ROB fault info field. This indicator informs the ROB that an unpredicted change in instruction flow must occur, i.e., instruction flow must be redirected from the predicted instruction flow (e.g., according to the BTB prediction for macro branches) to the correct instruction flow following a taken branch.

Upon detecting a mispredicted branch, the JE 116 also issues a signal JE Clear, which clears the in-order section of the microprocessor of all state generated by instructions fetched after the branch misprediction, i.e., instructions following the mispredicted branch instruction. The JE 116 then restarts instruction fetching at the correct instruction pointer. The JE also issues the "Mu" signal to indicate whether the mispredicted branch was a macro or a micro branch. Depending upon the value of [Mu], either the entire in-order section of the processor starting at the BTB is restarted (for a macro branch), or just the in-order section starting at the MS 107 for a micro branch. In one embodiment, the JEClear signal also stalls the RAT 114 and ALLOC 112 from issuing micro instructions to the out-of-order section of the processor.

Because the branch specified by the branch instruction should have been taken, instruction fetching must be restarted at the correct IP to follow the correct instruction flow. For macro branch mispredictions, the JE transfers the instruction pointer target address to the BTB 104 and IFU 102 to restart instruction fetching from the correct IP. For micro branch mispredictions, the JE transfers the micro instruction pointer target address (specified in the branch instruction) to the MS 107 to restart the microcode flow at the correct micro instruction pointer. Instruction flow then proceeds accordingly in the front end of the processor.

While the foregoing operations are taking place, micro instructions residing in the ROB 108 are retiring in order according to the count of the retirement pointer. Because retirement occurs in order, it is known that all instructions residing in the ROB 108 after the mispredicted branch uop must be instructions that are found in the mispredicted branch instruction flow. At some point, the mispredicted branch instruction will be retired. When this happens, the ROB 108 emits a signal, ROClear, that clears the entire out-of-order section of the processor of the instructions following the mispredicted branch uop. Because the ROClear signal clears the out-of-order section of invalid micro instructions, the ROClear signal is also used to unstall the issue of micro instructions from the in-order section of the processor. This action permits the instructions that have been fetched according to the correct target IP (due to the action of JEClear) to enter the out-of-order section of the processor.

(ii) Condition indicates not taken, Branch predicted taken

If the condition flags indicate that the branch is not to be taken but rather that the correct instruction flow is to continue with the fall through instruction, then the JE writes the flow control indicator "mispredicted+not taken" into the ROB fault info field to indicate that instruction flow must be redirected from the predicted instruction flow (here following a taken branch) to the correct instruction flow at the fall through instruction. The JE issues the JEClear signal as described above and stalls instruction issue from the in-order section. Instruction fetch is restarted at the fall through instruction by incrementing the instruction pointer of the mispredicted branch instruction to point to the next macro instruction to be fetched by the IFU 102, or to the next micro instruction to be issued by the MS 107, as the case may be. The details of restarting at the fall through instruction are described in later sections. As before, ROClear clears the out-of-order section after retiring the mispredicted branch micro instruction, and unstalls instruction issue from the in-order to the out-of-order section of the processor.

2. INDIRECT BRANCHING

An indirect branch instruction does not contain its target address within the instruction itself. Rather, the instruction specifies a register holding the target address value. Indirect branch macro instructions are of the form JUMP (reg), where register reg stores the actual target instruction pointer. The macro instruction is decoded by the instruction decoder 106 into the micro instruction [M]JUMP_INDIR (predicted_IP, reg).

The handling of an unconditional indirect branch instruction may be represented by the following pseudocode sequence:

```
IF reg = predicted_IP THEN
    write "correctly predicted + taken" into ROB
    write predicted IP into ROB
    retire predicted IP to RRF
ELSE
    write "mispredicted + taken" into ROB
    assert JEClear
    IP := reg
    stall instruction issue*
    after retirement of mispredicted branch, assert ROClear
    unstall instruction issue*
    retire correct IP
```

*Stalling instruction issue is optional. When implemented in an out-of-order processor, the present invention may stall the issue of micro instructions from the in-order section to the out-of-order section.

One can see from the pseudocode that the unconditional indirect branch instruction is processed in much the same manner as a conditional direct branch for which the condition is always true. The essential difference between the handling of direct and indirect instructions is that for direct instructions, the branch target is specified directly in the immediate field of the direct instruction, while the target of an indirect instruction must be read from the register reg specified by the instruction. As for the infrequently used conditional indirect branch instruction, that instruction type is handled in a manner similar to that of the conditional direct branch, taking into account the differences described above.

D. EVENTS

The present invention not only handles changes of control flow specified by instructions, but it also handles unexpected changes of the flow of control. These include exceptions and interrupts, which may occur during the execution of macro or micro instructions, requiring handling routines that affect either the macro or micro instruction pointer, respectively. As is well known in the art, the occurrence of an event or interrupt typically causes the processor to direct control to a micro code handler to handle the event or interrupt.

The processor of the present invention adopts a three-tiered approach to handling such unexpected events.

Interrupts are recognized directly at the ROB 108, which asserts a signal, RONuke, to clear both the in-order and out-of-order sections of the processor of all state. The signal also stalls instruction fetching by the IFU 102, and stalls the sequencing of micro instructions in the MS 107. The ROB directs the control flow to an interrupt handling microcode routine in the MS 107. The ROB sends the appropriate UIP of the first instruction of the handler to the MS depending upon the type of interrupt received. The interrupt itself may specify the starting UIP or the MS 107 or ROB 108 may maintain a mapping of interrupt type to starting UIP.

After the interrupt handler has completed its operations, the handler can instruct the IFU 102 to restart fetching of macro instructions from instruction memory, and restart the sequencing of micro instructions in the MS 107 at the correct micro instruction pointer, as described in detail in a later section of this application.

If the exception is recognized by an execution unit, e.g., a floating point divide would be recognized at a floating point execution unit (not shown), then the execution unit writes fault information to the ROB specifying the nature of the exception. When the micro instruction causing the exception retires, the ROB asserts RONuke and handles the exception in much the same manner as an interrupt.

If the exception is recognized by a unit earlier in the pipeline, e.g., at the IFU 102 or BTB 104, then the unit causes the sig_event(fault info) flow control micro instruction to be inserted into the pipeline. When this micro instruction is retired, the ROB handles it in much the same way as exceptions recognized later in the pipeline, as described above.

Thus, events are handled in a manner similar to that used to handle control flow changes caused by branch instructions. That is, information is attached to instructions as they flow through the pipeline. This information acts as a flow control indicator indicating that instruction flow is to be redirected from the predicted instruction flow to a "correct" instruction flow to handle the event. (Note that the predicted instruction flow may simply be the sequential instruction flow indicated by the sequential incrementing of the instruction pointer in a non-speculative in-order processor.) The processor typically does not act upon that information immediately, but later on near the end of an instruction's journey through the pipeline. This technique avoids the need to prioritize changes in control flow as described in the background to this invention.

III. HARDWARE UNITS

Specific hardware units will now be described to elaborate on the operation of the processor of the present invention.

A. DECODER

After being fetched by the IFU 102 according to a predicted instruction pointer from the BTB 104, a macro instruction is presented to the ID 106 for decoding.

Figure 2:
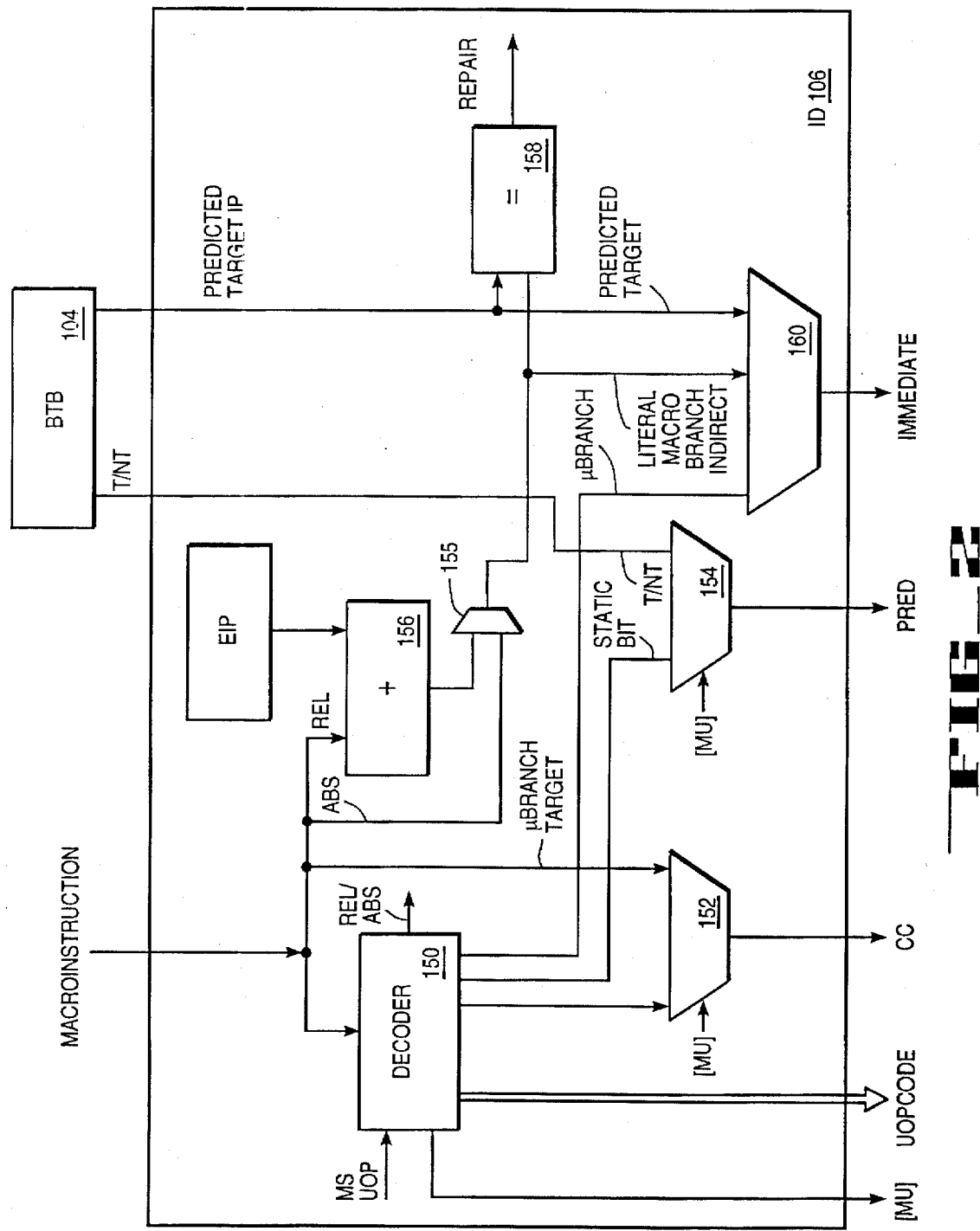
FIG. 2 is a block diagram of a branch instruction decoder of the present invention.

FIG. 2 illustrates branch related decoder circuitry in the ID 106 used to decode a single uop macro instruction. One skilled in the art could easily generalize this circuit to a macro instruction comprising more than one uop. The macro instruction is presented to a decoder 150, which produces the uopcode as well as control signals (not shown) for the multiplexers shown in the Figure. The circuitry in FIG. 2 provides a formatted uop to be passed on to the RAT 114 and allocator 112 either in response to a macro instruction or in response to a micro instruction produced by the micro instruction sequencer 107. Several fields of the decoded uop are extracted either from bits present in the input micro instruction or from bits emitted by the decoder 150 in response to an input macro instruction. For example, the condition field, cc, is extracted by the multiplexer 152 from the macro instruction if the macro/micro field [Mu] indicates a macro instruction. Otherwise, the condition code, cc, is extracted from the micro instruction by the decoder 150. Similarly, through multiplexer 154 controlled by the [Mu] field, the prediction field, PRED, is derived either from the prediction supplied by the BTB, indicated by the T/NT bit, for macro jumps, or from a static prediction bit in the microcode for micro branches.

One unique feature of the decoder circuitry is the manner in which it accounts for relative addressing. In the embodiment shown in FIG. 2, assume the macro branch instruction uses relative addressing. Accordingly, through multiplexer 155, the output of adder 156 is selected to provide the target address. The address of the macro instruction (in relative form) is added in adder 156 to the current instruction pointer, EIP, to obtain an absolute macro branch target address derived from the relative branch address. By converting the relative address to the absolute address at this point in the pipeline, the decoder avoids the necessity to perform this conversion at later units in the pipeline, such as the JE or ROB, to obtain an absolute address from which a restart address would be calculated.

Although not the subject of the present invention, it should be noted that the absolute address may be compared to the instruction pointer predicted by the BTB by a comparator 158, and the results of the comparison used to restart the processor at the correct target address.

The target address is placed by the instruction decoder into an immediate field of the branch uop according to a control signal (not shown) derived by the decoder 150 from the uop code. The multiplexer 160 selects the immediate target field either from the absolute target instruction pointer for conditional macro branches, the uop bits emitted by the decoder 150 for micro branches, or directly from the BTB predicted target instruction pointer for indirect macro branches.

B. RESERVATION STATION

The instruction decoder 106 transfers the stream of uops to the register alias table 114 and allocator 112. The allocator 112 and RAT 114 map the logical addresses specified by each uop to corresponding locations in the ROB 108 or RRF 110. The uops are then issued to the reservation station 118. For one embodiment, the instruction decoder issues up to three in-order uops during each cycle of the processor.

FIG. 3 illustrates the reservation station 118 with some sample entries. The RS 118 maintains a number of fields associated with each buffered uop. The Mu and uopcode fields hold the macro/micro indication bit and the micro instruction op code, respectfully. The PSRC1, PSRC2 and PDST fields respectively maintain the physical register addresses corresponding to the logical source 1(LSRC1), source 2 (LSRC2) and destination (LDST) register addresses specified by the instruction. The logical register addresses are not actually stored in the RS, but are shown here for illustrative purposes only. The data fields (SRC1 DATA, SRC2 DATA) store the data for the corresponding physical sources, and the corresponding valid bits (SRC1 VALID, SRC2 VALID) indicate that that data is valid and available.

The IMMEDIATE DATA field and corresponding valid bits (SRC1 IMM VALID, SRC2 IMM VALID) hold immediate data extracted directly from the instruction, and indicate whether the data was found at the first or second source field of the instruction, respectively, or in neither field.

The fields of the reservation station may be allocated in a number of ways to buffer instructions that change the control of instruction flow. For example, the conditional macro direct jump instruction JZ 220 decodes into the micro instruction Mjump.z.pred(ZF, 220), which is maintained in entry 2 of the RS 118 as shown in FIG. 3. Here, ZF represents the zero flag. Note that the zero flag may be stored in a separate register or be only one field of a general flags register holding a number of flags. The target address is stored in the IMMEDIATE DATA field of the RS because it is directly available from the instruction itself. The SRC2 IMM VALID bit is set to 1 to indicate that the immediate data was supplied by the second source field of the instruction. As shown in entry 2, the allocator has mapped the logical source ZF and the logical destination to ROB entries $ROB_c$ and $ROB_f$, respectively. Because the immediate data is already valid, the micro instruction at entry 2 need only wait for the JE 116 to become available and for the flags (SRC1 DATA) to become ready as the result of the execution of a previous instruction. When these conditions occur, the instruction may be dispatched to the JE 116. For the sake of convenience, the jump instruction is assumed to specify an absolute target address. One skilled in the art could easily modify the invention to apply to relative addresses using the decoder hardware described above.

As another example recall the sequence of micro instructions generated by the instruction decoder 106 for the macro instruction FAR_CALL:

| UIP | UOP |
| --- | --- |
| 1 | t ← read_creg (CR0).BOM |
| 2 | t ← and (t,P_bit) |
| 3 | unje.pred(t,6) |
|   | /*Real Mode 8086*/ |
| 4 | move_to_sreg (cs, ins_bytes_cs) |
| 5 | eip ← Mjump (offset). EOM |
|   | /*ProtMode 386*/ |
| 6 | write CS selector |
| 7 | write CS base |
| 8 | write CS limit |
| 9 | write CS permissions |
| 10 | eip ← Mjump (offset). EOM |

Each uop is indexed by a micro IP (uip). Note that during the decoding performed by the present invention, micro instructions 1, 5 and 10 have been marked with beginning and end of macro (BOM and EOM) flow markers to indicate the micro code boundaries of the FAR_CALL macro instruction. The micro branch instruction ujne.pred (t,6) is shown in entry 3 of the reservation station 118 of FIG. 3. This micro instruction jumps to the instruction at uip=6 if t≠0.

The micro branch instruction is issued by the MS 107 through the instruction decoder 106. The temporary register t, which acts as a condition flag for this micro instruction, is renamed by the allocator 112 to correspond to ROB entry $ROB_n$. The micro IP register uip is renamed to correspond to ROB entry $ROB_{n+1}$. After the temporary register t is calculated by the AND instruction at UIP=2, the SRC1 VALID bit is set as shown in FIG. 3. When the jump execution unit 116 become available, then reservation station 118 will dispatch the instruction to the jump execution unit 116.

As a third example, entry 9 of the RS 118 of FIG. 3 buffers the decoded micro instruction MJUMP.indir (predicted_IP, reg), which represents the macro instruction JUMP(reg). As shown in entry 9, the allocator has renamed the register reg to ROB entry $ROB_k$ and the EIP (instruction pointer) register, which holds the contents of the target address, to $ROB_{k+1}$. The predicted IP is an immediate value stored within the first operand field of the uop. Thus, the SRC1 IMM VALID bit is set. When the instruction filling register reg is computed, then the SRC2 VALID bit is set. When those conditions are satisfied and the jump execution unit becomes available, then the indirect branch uop is dispatched to the JE 116 for execution.

C. BRANCH EXECUTION UNIT

1. GENERAL OPERATION

FIG. 4 illustrates an embodiment of the jump (branch) execution unit (JE) 116. The JE 116 receives from the reservation station 118 the PDST, the op code of the jump instruction, including the Macro/Micro (Mu) bit, the conditions (cc) to be evaluated, the prediction taken bit (pred), and the indir field indicating whether the instruction is indirect or direct. For the sake of convenience in describing FIG. 4, all of these fields are considered to be part of the op code here. The JE 116 receives the contents of the pertinent flag register from the flags field maintained in the SRC1 DATA field of the RS 118. The JE 116 also selectively receives the SRC2 DATA and the IMMEDIATE DATA information through multiplexer 425 from the reservation station 118. The multiplexer 425 is controlled by the indir field so that the contents of the target register found in the SRC2 DATA field are passed as writeback data by the multiplexer 425 if the micro instruction is an indirect instruction, while the branch target found in the IMMEDIATE DATA field is passed if the micro instruction is a direct instruction.

As shown in FIG. 4, for a conditional direct instruction, a condition code evaluation unit (CCEU) 402 determines whether the branch condition is true, i.e., whether the branch should be taken. The CCEU 402 makes this determination by determining whether the flags (SRC1 DATA) in the flag register associated with the conditions (cc) specified by the condition code in the op code are set. In the example of the conditional macro jump given above, the condition is specified by the condition code Z, indicating that a branch is taken when the zero flag (ZF) is set.

The CCEU determination of whether a branch should be taken is compared to the prediction bit by a comparator 404, which may be implemented as an exclusive OR gate. In this embodiment, a satisfied (true) condition is represented by a 1 bit, while an unsatisfied (false) condition is represented by a 0. Similarly, a prediction taken (i.e., that the branch is taken) is represented by a 1, and a prediction not taken is represented by a 0. If the evaluation of the condition flags indicates a different branch result than the prediction bit, then a set misprediction bit is passed on to a multiplexer 406, which is controlled by the indir field of the uop. If no misprediction occurs, then the misprediction bit is not set.

If the instruction is an unconditional indirect instruction, then multiplexer 425 selects the contents of the target register reg found in the SRC2 DATA field as writeback data and multiplexer 420 selects IMMEDIATE DATA for input to comparator 410. The comparator 410 compares the target (SRC2 DATA) to the predicted IP stored in the IMMEDIATE DATA field of the RS 118 to determine whether a misprediction has taken place. (Note that the selection of the proper fields as input to the CCEU 402 and comparator 410 and as writeback data may occur elsewhere in the processor before the JE 116.)

The multiplexer 406 selects the correct misprediction information (depending on whether the instruction is direct or indirect) and passes it to the fault info field of the ROB 108. The misprediction bit is also passed to misprediction handling logic (MHL) 408. The multiplexer 425 selects the correct field (SRC2 DATA or IMMEDIATE DATA) for the branch target address to be passed on to the ROB 108 (depending on whether the instruction is direct or indirect, respectively), if the branch is taken.

The MHL 408 evaluates the misprediction bit to determine whether any error condition must be indicated and whether the processor must restart fetching at the correct instruction pointer.

If no misprediction has occurred, then the MHL 408 simply transfers the Mu bit to the ROB for further processing, as described below. Based upon the misprediction bit and the cc field, the fault info field will indicate "correctly predicted+taken" or "correctly predicted+not taken" as the case may be. For a taken branch, the JE 116 writes the target IP (EIP or UIP) into the ROB 108 so that the ROB can update the instruction pointer. For a correctly predicted nontaken branch, the ROB increments the IP, as described below.

On the other hand, in one embodiment, if the misprediction bit is set, then the MHL 408 issues the JEClear signal to the RAT 114 and allocator 112 to stall the issue of instructions from the allocator 112 to the out-of-order section of the processor (RS, ROB, RRF). The JEClear signal also flushes the in-order section of all state generated by instructions fetched after the branch misprediction. (Note that other instructions that were fetched after the branch misprediction may still be in the out-of-order section of the processor or in other execution units.) The Mu signal from the MHL indicates whether instruction fetching in the entire in-order section starting at the BTB is restarted (for a macro branch), or just the in-order section starting at the MS 107 (for a micro branch). Based upon the misprediction bit and the cc field, the fault info sent to the ROB specifies "mispredicted+taken" or "mispredicted+not taken."

In the case of a misprediction where the branch specified by the branch instruction should have been taken, instruction fetching must be restarted at the correct IP. For a macro branch misprediction, the MHL 408 transfers the instruction pointer (IP) target address (the immediate value from a direct instruction or the reg value from an indirect instruction) to the BTB 104 and IFU 102 to restart instruction fetching from the correct IP. For a micro branch misprediction, the MHL 408 transfers the micro instruction pointer target address (specified in the branch instruction) to the MS 107 to restart the microcode flow at the correct micro instruction pointer. Instruction flow then proceeds accordingly in the in-order section of the processor.

In the case of a misprediction where the branch should not have been taken, but rather instruction flow should have continued with the fall through instruction, then the JE writes "mispredicted+not taken" into the ROB fault info field. The MHL 408 issues the JEClear signal as described above and stalls instruction issue from the in-order section. Instruction fetch is restarted at the fall through instruction by incrementing the instruction pointer of the mispredicted branch instruction to restart fetching at the next macro instruction to be fetched by the IFU 102, or to the next micro instruction to be issued by the MS 107, as the case may be.

Alternatively, the above case of a macro branch predicted taken and actually not taken may be handled somewhat differently. In that situation, the BTB 104 mistakenly predicted that a branch should be taken, while program control should have continued on to the fall through instruction. For macro instructions, the difference in instruction pointer addresses may be denoted by the variable IP_delta. The address of the next macro instruction is calculated by adding IP_delta to the current instruction pointer. This calculation may be performed in the BTB 104. Thus, if a branch is mistakenly predicted as taken, then the JE 116 need not transfer the fall through IP to the BTB 104. Rather, upon receiving the JEClear signal, the BTB 104 will use the fall through IF to restart fetching of instructions.

In some architectures, such as the Intel microprocessor architecture, macro instructions are of variable length. In that case, IP_delta cannot be calculated until after the instruction is fetched by the IFU 102. In one embodiment, IP_delta may be added to the current instruction pointer in instruction decoder 106 to generate a next instruction pointer of fall through instructions. In another case, the result may be transferred to a branch information table (BIT) maintained in the BTB 104. As shown in FIG. 6, the branch information table stores the fall through instruction pointers for each branch instruction. The branch instruction table is indexed by the PDST of each branch instruction. In this embodiment, the JE 116 also sends the PDST along with JEClear upon detecting a misprediction so that the BTB may retrieve the correct fall through instruction pointer to restart fetching.

In one implementation, instructions are maintained in a segmented memory configuration, such as that used in the Intel microprocessor architecture. In that case, the jump execution unit 116 maintains a copy of the segment base address, and the misprediction handling logic 408 adds the segment base to the target address specified by the instruction to obtain a linear instruction pointer for fetching an instruction from segmented memory.

2. HANDLING MULTIPLE MISPREDICTED BRANCH INSTRUCTIONS

When the JE 116 executes a branch micro-op and determines that the branch was mispredicted by the BTB 104, the JE 116 usually flushes the front-end of the microprocessor (the Instruction Fetch Unit 102 to the Allocator 112), stalls the Allocator 112, and restarts the Instruction Fetch Unit 102 at the correct address. However, if JE 116 recently flushed the pipeline due to an older nonretired mispredicted branch, the JE 116 should not flush the pipeline again. Thus the JE 116 should only flush the pipeline if the mispredicted branch is the oldest nonretired mispredicted branch. This concept is presented clearly using FIGS. 7a through 7d that illustrate four possible branch misprediction situations.

Referring to FIG. 7a, there are two branches that occur sequentially in the computer code: Branch 1 and Branch 2. In the example of FIG. 7a, Branch 1 is executed first and was predicted correctly. Next, Branch 2 is executed and the JE 116 later determines that Branch 2 was mispredicted. Since the JE 116 determines that Branch 2 is the oldest nonretired mispredicted branch, it marks Branch 2 as mispredicted and performs the full branch misprediction recovery procedure.

FIG. 7b presents the situation where the second branch (Branch 2) is executed first (out-of-order) and was predicted "correctly" and the first branch (Branch 1) is executed second and was mispredicted. In this situation, the JE 116 determines that Branch 1 is the oldest nonretired mispredicted branch and therefore marks Branch 1 as mispredicted and performs the full branch misprediction recovery procedure.

FIG. 7c presents the situation where the second branch (Branch 2) is executed first (out-of-order) and was mispredicted; and the first branch (Branch 1) is executed second and was also mispredicted. The JE 116 first executes Branch 2, then the JE 116 later determines that Branch 2 is the oldest nonretired mispredicted branch and therefore marks Branch 2 as mispredicted and performs the full branch misprediction recovery procedure to start fetching instructions at a corrected target address. (Note that Branch 1 is not the oldest nonretired mispredicted branch when Branch 2 is executed because Branch 1 has not yet been executed.) After executing Branch 2, the JE 116 then executes Branch 1 and determines that Branch 1 has been mispredicted. Since Branch 1 is older than Branch 2 (Branch 1 occurs first in the program order), Branch 1 is the oldest nonretired mispredicted branch. Thus, the JE 116 again performs the full branch misprediction recovery procedure to start fetching instructions at a corrected target address.

FIG. 7d presents the situation where the first branch (Branch 1) is executed first and was mispredicted; and the second branch (Branch 2) is executed second and was also mispredicted. The JE 116 executes Branch 1, and determines that Branch 1 is the oldest nonretired mispredicted branch. The JE 116 therefore marks Branch 1 as mispredicted and performs the full branch misprediction recovery procedure. Next, when the JE 116 executes Branch 2, the JE 116 determines that Branch 2 is not the oldest nonretired mispredicted branch since Branch 1 is an older nonretired mispredicted branch. Thus, the JE 116 does not perform the branch misprediction recovery procedure. Furthermore, the JE 116 does not send branch outcome or branch target address information to the BTB 104 since the branch instruction should not have executed. Note that if the JE 116 performed the branch misprediction recovery procedure, the microprocessor would have started executing the wrong instructions since Branch 2 itself never should have been executed.

Thus, in summary, the JE 116 compares a predicted branch target with the actual target to determine whether the branch is mispredicted. When the JE 116 detects a mispredicted branch, the JE 116 tests to see if the mispredicted branch is the oldest nonretired mispredicted branch detected by the JE 116 up to that point. If the mispredicted branch is the oldest nonretired mispredicted branch, the JE 116 flushes the entire front end of the microprocessor, restarts the front-end of the microprocessor at the correct address, and prevents any new micro-ops from entering the out-of-order section of the microprocessor by stalling the Allocator 112.

The hardware (not shown) that determines the oldest nonretired mispredicted branch may be found in the MHL 408 of FIG. 4. As mentioned above, the allocator 112 maintains an allocation pointer that points to the next ROB entry (denoted by a PDST) that may be allocated a micro instruction. The allocator also maintains an age field, which in one embodiment is one bit wide and contains an "age bit." The age bit is sent along with the PDST through the processor. The allocator 112 allocates entries in sequential order from low-numbered PDSTs to higher-numbered PDSTs. Thus, one would normally expect a micro instruction at entry 1 to have been allocated before a micro instruction found at entry 7. However, because the ROB 108 is a circular buffer exhibiting wraparound, the entry specified by the higher PDST may actually have been allocated before the micro instruction specified by the lower PDST. For example, assume a ROB holding entries 0–7. During one clock cycle, the allocator 112 may allocate three micro instructions at one time to entries 7, 0 and 1. In this example, those entries may be the only entries available because entries 2–6 are filled with micro instructions awaiting retirement. To account for wraparound, the allocator 112 sets an age bit associated with entries 0 and 1. In a binary representation, attaching the age bit as the most significant bit would convert 0 and 1 to $1000_2$ and $1001_2$ or decimal 8 and 9, respectively. Thus, when MHL 408 compares entry 7 to entries 0 (8) and 1 (9), MHL 408 determines that entry 7 is actually the oldest mispredicted branch instruction.

Handling multiple mispredictions also requires a last mispredicted branch valid bit (LMBV), which may be stored in the MHL 408. The LMBV bit is initially not set. Moreover, when the bit is eventually set, retired mispredicted branches later clear it through the action of ROClear (described below). Thus, when the MHL 408 first detects a misprediction with the LMBV bit not set, then the branch must be the oldest nonretired mispredicted branch. Accordingly, the JE 116 asserts JEClear and stalls the allocator, thus performing misprediction recovery. The MHL 408 also sets the LMBV bit and stores the PDST and age bit for that branch micro instruction.

When the MHL 408 detects a subsequent mispredicted branch and the LMBV bit is still set, then the MHL 408 compares the relative branch ages as described above. If the subsequent branch is older, then the MHL 408 will perform misprediction recovery. Through the use of the age bit and the LMBV bit, the MHL 408 implements the procedure for handling multiple branches described above.

D. REORDER BUFFER

FIG. 5 illustrates an embodiment of the reorder buffer 108 of the present invention. The ROB 108 is shown coupled to retire control circuit (RCC) 140 and to real register file 110, which stores information in committed architectural registers. The ROB 108 includes a ROB table 500, an instruction pointer (IP) calculator 502, and event detect logic 504. Each ROB entry is indexed by the PDST ($ROB_i$). Each entry maintains result data written back from the execution units, fault info, the logical destination (LDST) of the micro instruction associated with the entry, a valid bit indicating that the entry contains valid data, flow markers indicating whether the micro instruction represents the beginning or ending micro instruction of a macro instruction micro code sequence, and IP_delta.

As an example, the ROB table 500 is shown storing the relevant data for the conditional macro instruction from entry 2 of the RS 118. Referring back to FIG. 4, it can be seen that the target address is passed from the IMMEDIATE DATA field of the RS 118 through multiplexer 425 as writeback data to the result data field of the ROB.

The retire control circuit 140 controls the commitment of the speculative results held in the ROB 108 to the corresponding architectural state in the RRF 110. Recall that the ROB 108 is implemented as a circular buffer. The retire control circuit 140 maintains a retirement pointer that is implemented as a counter that accounts for the wraparound property of the circular ROB 108 buffer. Micro instruction entries in the ROB 108 are retired in original program order according to the retirement pointer.

1. RETIREMENT OF BRANCHES

Assuming that a micro instruction experiences no branch mispredictions, exceptions or interrupts, then the information stored in that instruction's ROB entry will be retired to the architectural state in the RRF 110 when the retirement pointer is incremented to point to that entry. In this case, the IF calculator 502 increments the macro or micro instruction pointer either to point to the branch target address specified in the ROB result data field if a branch is taken, or to point to the next macro or micro instruction if a branch is not taken (depending on the state of the Mu bit). Note that the macro IP is incremented to point to the next macro instruction only when the retiring micro instruction is the last micro instruction in a micro code flow representing the macro instruction, as indicated by an EOM marker carried by the micro instruction. In summary, if no mispredictions, events or interrupts have occurred, then at retirement the processor has already been following the correct instruction path and no erroneous instructions have been fetched. Thus, the instruction is simply retired and the IP updated appropriately.

If, however, a branch misprediction has occurred, this information is conveyed through the fault info field to the IP calculator 502 and the event detect logic 504. Because of the misprediction, the processor has been fetching at least some erroneous instructions. Some of those instructions most likely have made their way into the RS 118 and ROB 108 before JEClear flushed the in-order section of the processor. Thus, those instructions must eventually be flushed from the out-of-order section. Because retirement occurs in order, it is known that all instructions stored in the ROB 108 after storage of a mispredicted branch uop must be instructions that are found in the mispredicted branch instruction flow. At some point, the mispredicted branch instruction will be retired with the correct updated state. When this happens, the event detect logic 504 of the ROB 108 emits a signal, ROClear, that clears the entire out-of-order section of the processor of all state, thus flushing the out-of-order section of all state resulting from instructions following the mispredicted branch uop.

The ROClear signal is also used to unstall the issue of micro instructions from the in-order section of the processor. This action permits the instructions that have been fetched according to the correct target IP (due to the action of JEClear) to enter the out-of-order section of the processor. Furthermore, the ROClear signal, as noted above, is used to reset the LMBV bit because after ROClear has been asserted, no more mispredicted branches reside in the ROB 108, and thus any mispredicted branches thereafter reaching the JE 116 must, relatively speaking, be the first (oldest) nonretired mispredicted branch to reach the JE 116 after ROClear has been asserted.

Upon being notified of a misprediction through the fault information, the IF calculator 502 acts to ensure that the IP is updated to represent the correct instruction pointer value. Based upon whether the branch is to be taken or not taken, the IF calculator 502 either updates the IF with the result data value from the ROB table 500 or increments the IF of the mispredicted branch instruction to point to the next (fall through) macro or micro instruction.

2. EXCEPTIONS AND INTERRUPTS

As mentioned above, the present invention not only handles changes of control flow specified by instructions, but also unexpected changes of flow (events), such as exceptions and interrupts. As with mispredicted branches, these events cause a flow control indicator to flow in the pipeline to indicate that instruction flow must be redirected from the predicted instruction flow to a "correct" instruction flow to handle the event.

(a) INSTRUCTION RESTART IN GENERAL

As shown in FIG. 5, the event detect logic 504 receives interrupt requests. Upon recognizing an interrupt, the event detect logic 504 issues the RONuke signal to clear the entire processor of all state. In one embodiment, the logic 504 will not interrupt the retirement of a macro instruction and thus will not assert RONuke until the micro instruction carrying the EOM marker for that macro instruction has retired. The RONuke signal also stalls instruction fetching by the IFU 102, and starts the sequencing of micro instructions in an interrupt handler found in the MS 107.

The interrupt request is in the form of an interrupt vector. Different types of interrupts cause different handling routines to be invoked. The mapping of interrupt type to handler starting address may be maintained in the processor, e.g., in the MS 107 or the logic 504, or in the interrupt vector itself.

As part of its operations, the interrupt handler reads the EIP from the RRF. Because the event detect logic 504 has preferably allowed a full macro instruction to retire, the EIP will point to the next macro instruction after the macro instruction that was retired just before the interrupt handler was invoked.

Exceptions can be loosely classified as faults, traps, and assists, among others. Exceptions are events that are generated within the processor, unlike interrupts, which are generated externally. Exceptions are handled in essentially the same manner, according to the following steps:

1. write fault info into ROB
2. assert RONuke, clear processor, stall fetching
3. invoke microcode handler based upon fault info
4. fetch restart address
5. restart fetching Like an interrupt, a trap is handled on a macro instruction boundary so as not to affect retirement of the instruction. The micro instruction causing the trap is executed by an execution unit, which writes status information concerning the trap into the fault info field of the ROB 108. After the macro instruction containing the trapping micro instruction has been retired (i.e., EOM has been detected), the event detect logic 504 asserts RONuke to clear the processor and stall macro instruction fetch at the IFU 102 and micro instruction sequencing (generically also referred to as "fetching") at the MS 107. Based upon the fault info, the event detect logic 504 causes the MS 107 to jump to the UIP of the appropriate micro code trap handler. After the trap has been handled, the handler fetches from the RRF the EIP of the next instruction following the macro instruction containing the trap. The handler then invokes a macro jump to that EIP to restart instruction fetch.

Other exceptions, e.g., faults and assists, are handled somewhat differently in that they can prevent a macro instruction from successfully retiring. Thus, unlike the case of trap handling, the processor may need a mechanism to restart at both an EIP and a UIP, as described below.

When a micro instruction causes a fault, information concerning the nature of the fault is written into the fault info field of the ROB 108. (The term "fault" will be used here generically to describe both faults and assists and other similar exceptions.) As discussed above, if the fault occurs during execution, then the execution unit recognizes the fault and writes the fault info. If, however, the fault is recognized earlier in the pipeline, then the unit recognizing the fault causes the ID 106 to generate the sig_event (fault info) uop to carry the fault info down the pipeline. The sig_event micro instruction is executed by an integer execution unit that moves the immediate data (representing fault info) into the fault info field of the ROB 108.

During retirement of a micro instruction from a ROB entry, the fault info is sent to the event detect logic 504. Upon detecting the fault from the fault info field, the logic 504 asserts RONuke to flush the processor and stall instruction fetching and micro code sequencing. In this case, the logic 504 does not wait for the faulting macro instruction to complete retirement. The logic 504 also invokes the appropriate micro code handler in the MS 107 based upon the fault info.

After handling, depending upon the handler, the handler in the MS 107 may refetch not only the EIP, but also the UIP because the logic 504 allowed the retirement of the micro code sequence representing the retiring macro instruction to be interrupted. If the EIP is to be refetched, the logic 504 fetches the EIP from the architectural EIP register in the RRF 110. Because the faulting macro instruction was not given the chance to retire, the EIP was not updated and thus still represents the EIP of the faulting macro instruction. Using this refetched EIP, the logic 504 causes the IFU 102 to refetch the (previously) faulting macro instruction. Upon decoding, the micro code sequence representing the instruction is again found in the MS 107.

The event detect logic 504 must now restart the micro code sequence at the correct UIP so that the processor can complete the macro instruction that was interrupted by the fault. The UIP is stored in the RRF 110 and is fetched by the event detect logic 504. The UIP is then forwarded by the logic 504 to the MS 107 to continue micro code sequencing from where it left off before interruption.

The RRF 110 receives the UIP through a unique mechanism. In one embodiment of the present invention, the micro code sequence of any macro instruction that could cause a fault contains a special instruction denoted "transport_uip" that carries its own UIP. The instruction transport_uip is inserted into the micro code anywhere in the sequence before a potentially faulting micro instruction and preferably before any microbranch instructions. When the transport_uip instruction retires, the ROB and RRF will be informed of the UIP of that instruction. The ROB then updates the UIP of subsequent micro instructions by simply adding one to the UIP. Thus, transport_uip provides a benchmark for calculating the UIP of retiring micro instructions.

Note that the way in which events are handled can be generalized to apply to recovery from branch mispredictions. That is, rather than using a two part mechanism (asserting JEClear and ROClear), branch misprediction recovery may be effected using the single RONuke implementation. The division of misprediction recovery into two parts is a performance optimization allowing for earlier handling than would take place if the processor waited until retirement to correct mispredictions.

(b) INSTRUCTION REFETCH AND THE VICTIM CACHE

The previous discussion assumes that when the EIP is sent to the IFU 102 to effect refetching of a macro instruction, the macro instruction is available for refetching from the instruction cache 103. However, this may not be the case. During the time it takes for the processor to fetch an instruction and detect and handle an event or determine the correct restart address after a branch misprediction, the instruction may no longer be stored in the cache 103. For example, a second processor coupled to the cache 103 may cause the cache line that previously contained the faulting instruction to be overwritten, thereby causing cache incoherency (note that, in the case of a microbranch misprediction, the corresponding macrobranch may need to be refetched to obtain the microcode sequence containing the mispredicted microbranch at the decoder so that the correct microbranch instruction flow may be achieved. For a macrobranch misprediction, the mispredicted macrobranch need not be refetched because the correct instruction flow starts at a new EIP).

The present invention solves this problem by extending the instruction cache 103 to include a victim cache 105, as shown in FIG. 1. Instructions in the instruction cache 103 may be forced out of the cache 103 for a number of reasons. For example, each time the IFU 102 calls for an instruction from memory (using the EIP), the instruction is cached in the cache 103. At some point, the cache 103 will reach full capacity and the fetching of one more instruction will force the cache 103 to overwrite one of its cache lines, typically according to a cache replacement policy such as the standard LRU (least recently used) policy. Alternatively, a second processor using the cache 103 may fetch an instruction that will overwrite a line in cache 103 under similar circumstances. In either case, the present invention includes a victim cache 105 to store cache lines that have been victimized from the instruction cache 103.

The instruction cache and the victim cache 105 operate under the inclusion principle that the cache line containing an instruction that may need to be refetched is always stored either in instruction cache 103 or victim cache 105. Under this scenario, whenever the IFU 102 attempts to fetch an instruction, it presents the instruction address (EIP) to both the instruction and victim caches. If a hit occurs in the victim cache 105, then a swap occurs and the instruction is moved from the victim cache 105 to the instruction cache 103, and an instruction from the instruction cache 103 is transferred to the victim cache 105 to replace the moved instruction. This replacement policy may also adopt the LRU approach, among other well known replacement methods.

Under the inclusion policy, the caches 103 and 105 must store instructions that may need to be refetched. Thus, they must hold an instruction until it is retired because only at retirement does the processor know that an instruction has flowed through the processor without further need for branch misprediction recovery or event handling. Because the victim cache 105 is of limited capacity, at some point it may become full of victimized instruction cache lines that have not yet retired. At that point, to maintain the inclusion policy, instruction fetching by the IFU 102 must be stalled to avoid attempts to store more instructions in the caches 103 and 105. Subsequent pipestages are permitted to process instructions and effectively "drain" the rest of the processor of instructions.

When an instruction retires, instruction fetching may recommence and the victim cache line holding the instruction can be deallocated to free it to receive other instructions. The manner in which this process is implemented takes place as follows. When an instruction is allocated from the instruction cache 103 to the victim cache 105, the IFU 102 causes the ID 106 to insert a special marker micro instruction into the pipeline. The marker identifies the entry in the victim cache that holds the recently victimized instruction. When the marker eventually makes it to the retirement stage, the retire control logic 140 issues a pointer to the IFU 102 to deallocate the victim cache line corresponding to the retired marker.

A problem with this scheme may occur if a misprediction or event prevents the marker micro instruction from retiring, i.e., it is cleared from the processor during machine recovery. In that case, eventually after recovery a marker inserted into the pipeline due to a subsequent victimized instruction will make it to retirement. When that happens, the victim cache 105 deallocates not just the line corresponding to the retired instruction, but also all older victimized cache lines that have not yet been deallocated. The victim cache 105 may be implemented as a circular buffer, and thus the deallocation of cache lines according to age may take place in a manner similar to that used to determine branch aging for multiple mispredicted branches.

Finally, the IFU/ID must always reinsert the last marker micro instruction when fetching is stalled due to a full victim cache, and an event or misprediction occurs that may eliminate all previously inserted marker micro instructions.

COMPUTER SYSTEM

The microprocessor of the present invention may be added to a general purpose computer system as shown in FIG. 8. Generally the computer system of the present invention comprises an address/data bus 1000 for communicating information, a central processor 1002 coupled with the bus for processing information and executing instructions, a random access memory 1004 coupled with the bus 1000 for storing information and instructions for the central processor 1002, and a read only memory 1006 coupled with the bus 1000 for storing static information and instructions for the processor 1002. Also available for interface with the computer system of the present invention is a data storage device 1008 such as a magnetic disk or optical disk drive, which may be communicatively coupled with the bus 1000, for storing data and instructions.

The display device 1010 utilized with the computer system of the present invention may be a liquid crystal device, cathode ray tube, or other display device suitable for creating graphic images and/or alphanumeric characters recognizable to the user. The computer system may also contain an alphanumeric input device 1012 including alphanumeric and function keys coupled to the bus 1000 for communicating information and command selections to the central processor 1002, and a cursor control device 1014 coupled to the bus 1000 for communicating user input information and command selections to the central processor 1002 based on a user's hand movement. The cursor control device 1014 allows the network user to dynamically signal the two-dimensional movement of a visible symbol (pointer) on a display screen of the display device 1010. Many implementations of the cursor control device are known in the art, including a track ball, mouse, joystick or special keys on the alphanumeric input device 1012, all capable of signaling movement in a given direction or manner of displacement.

The computer system of FIG. 8 also contains an input/output device 1016 coupled to the bus 1000 for communicating information to and from the commuter system. The communication device 1016 may be composed of a serial or parallel communication port or may be a communication modem. It is appreciated that such a communication device 1016 may provide an interface between the bus 1000 and the user interface devices (keyboard 1012, cursor 1014, display 1010) of the computer system. In this case, the user interface devices will reside within a terminal device which is coupled to the communication device 1016 so that the processor 1002, the RAM 1004, the ROM 1006 and storage device 1008 may communicate with the terminal. The components 1002, 1004, 1006 and 1008 may be implemented on a single board or a computer chassis 1018, which is then coupled by a bus 1000 to the other components of the computer system.

It will be appreciated that various modifications and alterations might be made by those skilled in the art without departing from the spirit and scope of the present invention. For example, the use of the Intel architecture by the present invention is but one implementation. The present invention applies to other processor designs and instruction sets, as well. Further, the present invention may be physically embodied in a variety of packages. The present invention may be built into one integrated circuit package or have its functionality spread over a number of chips, or be implemented by an emulator. Moreover, the invention may be constructed on chips of different materials, such as silicon or gallium arsenide. Finally, although the present invention allows speculative out-of-order execution and is superscalar, aspects of the present invention operate effectively within pipelined processors that perform neither speculative execution, out-of-order execution, nor superscalar operation. The invention should, therefore, be measured in terms of the claims which follow.

What is claimed is:

1. A speculative execution processor having at least one pipeline comprising:

an instruction cache storing macro instructions;

a victim cache storing a macro instruction expelled from said instruction cache;

means for fetching said macro instruction from either said instruction cache or said victim cache;

means for a inserting a marker instruction into said pipeline when said macro instruction is expelled from said instruction cache, said marker instruction specifying a cache line in said victim cache corresponding to said macro instruction, said cache line being deallocated upon commitment of said marker instruction to an architectural state, said insertion means reinserting said marker instruction into said pipeline when said victim cache is full and a branch misprediction occurs.

2. The processor of claim 1, further comprising means for stalling said fetcher when said victim cache is full until said marker instruction has been committed to said architectural state, wherein entries in said victim cache that are older than said cache line are deallocated upon commitment of said marker instruction to said architectural state.

3. In a processor for speculative execution of instructions, said processor having at least one pipeline and a means for fetching macro instructions, a method of operating said processor comprising the steps of:

storing a macro instruction in an instruction cache;

expelling said macro instruction from said instruction cache due to a replacement;

storing said macro instruction in a victim cache;

inserting a marker instruction into said pipeline, said marker instruction specifying an entry in said victim cache corresponding to said macro instruction;

deallocating said entry, and all victim cache entries older than said entry, in said victim cache specified by said marker instruction upon commitment of said marker instruction to an architectural state; and, in the event that said victim cache is full and a branch misprediction occurs, reinserting said marker instruction into said pipeline.

4. The method of claim 3 further comprising the steps of:

stalling instruction fetching when said victim cache is full; and resuming instruction fetching once said marker instruction has been committed to said architectural state.

5. A computer system comprising:

a memory device for storing information including macro instructions;

a bus coupled to said memory device; and a processor for fetching and speculatively executing instructions, said processor including:

at least one pipeline;

an instruction cache coupled to said bus, said instruction cache storing a plurality of macro instructions received from said memory device;

a victim cache coupled to said instruction cache, said victim cache storing macro instructions expelled from said instruction cache;

means for inserting a marker instruction in said pipeline when a macro instruction is expelled form said instruction cache, said marker instruction specifying an entry in said victim cache corresponding to said macro instruction, said insertion means reinserting said marker instruction into said pipeline when said victim cache is full and a branch misprediction occurs;

circuitry for storing an architectural state of said processor;

and wherein said victim cache further includes state logic that deallocates said entry, and all victim cache entries older than said entry, in said victim cache upon commitment of said marker instruction to said architectural state.

6. The computer system of claim 5, further comprising means for stalling fetching of said macro instructions from either said instruction cache or said victim cache when said victim cache is full until commitment of said marker instruction to said architectural state.

* * * * *